United States Patent
Asano et al.

(10) Patent No.: US 8,121,201 B2
(45) Date of Patent: Feb. 21, 2012

(54) PULSE TRANSMITTER, PULSE RECEIVER, PULSE TRANSMITTING METHOD, AND PULSE DEMODULATING METHOD

(75) Inventors: Hitoshi Asano, Miyagi (JP); Hideki Aoyagi, Miyagi (JP); Michiaki Matsuo, San Jose, CA (US)

(73) Assignee: Panasonic Corporation, Osaka (JP)

( * ) Notice: Subject to any disclaimer, the term of this patent is extended or adjusted under 35 U.S.C. 154(b) by 652 days.

(21) Appl. No.: 12/297,561

(22) PCT Filed: Apr. 19, 2007

(86) PCT No.: PCT/JP2007/058514
§ 371 (c)(1), (2), (4) Date: Dec. 2, 2008

(87) PCT Pub. No.: WO2007/123174
PCT Pub. Date: Nov. 1, 2007

(65) Prior Publication Data
US 2009/0080540 A1 Mar. 26, 2009

(30) Foreign Application Priority Data

Apr. 20, 2006 (JP) ................. 2006-117259
Apr. 16, 2007 (JP) ................. 2007-107032

(51) Int. Cl.
H04B 14/04 (2006.01)
(52) U.S. Cl. ......... 375/242; 375/238; 375/239; 332/109
(58) Field of Classification Search .................. 375/242, 375/238, 239; 330/251; 332/109
See application file for complete search history.

(56) References Cited

U.S. PATENT DOCUMENTS 5,640,316 A * 6/1997 Moriya ........................... 363/41
7,391,280 B2 * 6/2008 Hsu ................................ 332/109
2003/0235246 A1 * 12/2003 Dress et al. ................... 375/238

* cited by examiner

Primary Examiner — Eva Puente
(74) Attorney, Agent, or Firm — Dickinson Wright PLLC

(57) ABSTRACT

A pulse transmitter having a relatively simple structure and generating a pulse modulating signal even at a high transmission rate. In the pulse transmitter, a symbol pulse generating part (103) generates a symbol pulse of amplitude level β when data S1 is "0," and that of amplitude level &ggr; when data S1 is "1" in the first pulse slot section, the data pulse generating part (104) generates a data pulse of amplitude level 0 when data S2 to Sn is "0," and that of amplitude level α when data S2 to Sn is "1" in a later pulse slot section. The relationship of the amplitude levels keep the relation α<β<&ggr;. An adder (105) adds the symbol pulse and the data pulse and outputs the sum as a pulse modulating signal.

14 Claims, 16 Drawing Sheets

PULSE TRANSMITTER, PULSE RECEIVER, PULSE TRANSMITTING METHOD, AND PULSE DEMODULATING METHOD

TECHNICAL FIELD

The present invention relates to a pulse transmitting apparatus, pulse receiving apparatus, pulse transmitting method and pulse demodulating method. More particularly, the present invention relates to a pulse transmitting apparatus, pulse receiving apparatus, pulse transmitting method and pulse demodulating method for use in wireless communication and optical communication.

BACKGROUND ART

Pulse transmission methods include various methods such as the OOK (On Off Keying) modulation scheme of transmitting information depending on whether or not there is a pulse, the PPM (Pulse Position Modulation) modulation scheme of transmitting information according to the pulse positions and the PWM (Pulse Width Modulation) modulation scheme of transmitting information according to the pulse width, and the optimal modulation scheme is adapted according to the system in which transmission is carried out.

Further, methods of transmitting information from the transmitting end to the receiving end include the parallel transmitting method of transmitting information in a plurality of transmission sequences and the serial transmitting method of transmitting information in one transmission sequence. The serial transmitting method refers to a method of time-dividing one transmission sequence and multiplexing and transmitting information of an applicable sequence per time that is time-divided. The serial transmitting method uses a smaller number of transmission sequences than the parallel transmitting method of performing transmission using a plurality of transmission sequences, and provides an advantage of simplifying the configuration of the transmitting means. Consequently, the serial transmitting method is adopted more often than the parallel transmitting method in wired communication and wireless communication in recent years.

For example, Patent Document 1 discloses a serial transmitting method using the PWM modulation scheme as a serial transmitting method using the pulse transmitting scheme. The method disclosed in Patent Document 1 refers to transmitting a plurality of combinations of data using pulse signals of a pulse width determined in advance. FIG. 1 shows the relationship between data and pulse signals in a case where the method disclosed in Patent Document 1 is used. As shown in FIG. 1, according to this transmitting method, transmission is performed by defining and arranging four pulse widths (W00, W01, W10 and W11) in the time of symbol period T, depending on the value of m, which represents a quadrature of symbol data comprised of n=2 bits, and allowing transition from H (Hi) to L (Low) only once.

FIG. 2 shows a main configuration of a demodulating apparatus used in the transmitting method disclosed in Patent Document 1. Rise detecting section 11 detects the rise of the received PWM modulated signal and reproduces a clock signal employing a clock period twice symbol period T. Then, PLL circuit 12 uses the reproduced clock signal to generate a high-speed clock signal for detecting the minimum pulse width. Counter 13 measures each pulse width of the PWM modulated signal using the generated high-speed clock signal as a reference. Data generating section 14 estimates the pulse width based on the measured value, and symbol data matching the pulse width is converted and demodulated. That is, given that the above transmitting method enables serial transmission of a plurality of bits by means of the pulse width, there is an advantage that use efficiency of the transmission sequence is high.

Further, in the above transmitting method, given that the transition from H to L takes place only once in the time of symbol period T, the symbol clock of symbol period T can be extracted from the PWM modulated signal received in the demodulating apparatus, so that a high-speed clock signal synchronized with the PWM modulated signal can be generated as a high-speed clock signal for detecting the minimum pulse width. Furthermore, the pulse width is detected by measuring each pulse width of the received PWM modulated signal using the high-speed clock signal, and symbol data matching the pulse width is demodulated.

Patent Document 1: Japanese Patent Application Laid-Open No. HEI9-36923 (page 7, FIG. 3, and page 8, FIG. 2)

DISCLOSURE OF INVENTION

Problems to be Solved by the Invention

However, according to the above transmitting method, there is a problem that, when the transmission rate becomes high-speed, the circuit scale of the demodulating apparatus increases and the configuration becomes more complicated. That is, according to the above transmitting method, even if symbol period T is the same, when the transmission rate becomes high-speed, the number of bits n assigned to one symbol data increases and the minimum pulse width $P=T/(2^n+1)$ becomes narrower. Consequently, a clock signal that is higher-speed and more accurate than the symbol clock is required to generate or detect the minimum pulse width, and therefore the circuit scale increases and the configuration becomes more complicated. Further, even if the number of bits n of data assigned to one symbol data is the same, when symbol period T shortens and the transmission rate becomes high-speed, the minimum pulse width P narrows. Consequently, a clock signal that is higher-speed and more accurate than the symbol clock is required to generate or detect the minimum pulse width, and therefore the circuit scale increases and the configuration becomes more complicated.

It is therefore an object of the present invention to provide a pulse transmitting apparatus, pulse receiving apparatus, pulse transmitting method and pulse demodulating method that, even when the transmission rate becomes high-speed, are able to generate and demodulate a pulse modulated signal with a comparatively simple configuration.

Means for Solving the Problem

To solve the above problems, the pulse transmitting apparatus according to the present invention employs a configuration including: a distributing section that distributes n bits of data information, bit by bit, to pulse slots having a slot width of a one-n-th of a symbol period; a data pulse generating section that selects an amplitude level matching the data information distributed to subsequent pulse slots other than a head pulse slot, and generates a data pulse modulated signal in intervals of the subsequent pulse slots; a symbol pulse generating section that selects, from binary amplitude levels greater than the amplitude level of the data pulse modulated signal, one of the amplitude levels according to the data information distributed to the head pulse slot, and generates a symbol pulse modulated signal in the head pulse slot interval;

and an adding section that adds the symbol pulse modulated signal and the data pulse modulated signal and generates a pulse modulated signal.

According to this configuration, transmission is performed by changing the amplitude level of the pulse modulated signal generated in each pulse slot interval on a per pulse slot basis according to the data information assigned to each pulse slot and the pulse slot position in symbols, and data information is prevented from being assigned in the pulse width. Consequently, even when the transmission rate becomes high-speed, the high-speed clock signal for controlling the pulse width is not necessary and the pulse modulated signal can be generated with a comparatively simple configuration. Further, regardless of data information, the amplitude level of the pulse modulated signal in the head pulse slot interval is greater at all times than the amplitude levels of the pulse modulated signal in the subsequent pulse slot intervals, so that it is easy to detect the head pulse slot position and acquire synchronization with the pulse modulated signal in a reliable manner. Furthermore, a symbol timing and data information can be superimposed in the head pulse slot, so that it is possible to prevent deterioration of transmission efficiency.

The pulse receiving apparatus according to the present invention employs a configuration including: a receiving section that receives a pulse modulated signal transmitted by distributing symbol data formed with n bits of data information per symbol, bit by bit, to pulse slots having a slot width of a one-n-th of a symbol period; a symbol timing detecting section that detects a position of a head pulse slot by performing threshold decision of an amplitude level of the pulse modulated signal and a first threshold; a head data extracting section that extracts the data information distributed to the head pulse slot by performing threshold decision of the amplitude level of the pulse modulated signal and a second threshold; and a subsequent data extracting section that extracts the data information distributed to the subsequent pulse slots by performing threshold decision of the amplitude level of the pulse modulated signal and a third threshold.

According to this configuration, the head pulse slot showing the symbol timing position and the data information distributed in the head and the subsequent pulse slots can be extracted by threshold decision. Consequently, the high-speed clock signal is not necessary, so that simplification, miniaturization and lower power consumption of the pulse receiving apparatus can be realized without increasing the circuit scale. Further, by performing threshold decision using different thresholds, it is possible to separate the symbol timing and data information superimposed in the head pulse slot and prevent deterioration of transmission efficiency.

ADVANTAGEOUS EFFECT OF THE INVENTION

According to the present invention, it is possible to provide a pulse transmitting apparatus, pulse receiving apparatus, pulse transmitting method and pulse demodulating method that, even when the transmission rate becomes high-speed, are able to generate and demodulate a pulse modulated signal with a comparatively simple configuration.

BEST MODE FOR CARRYING OUT THE INVENTION

Hereinafter, embodiments of the present invention will be described using drawings.

(Embodiment 1)

Figure 1:
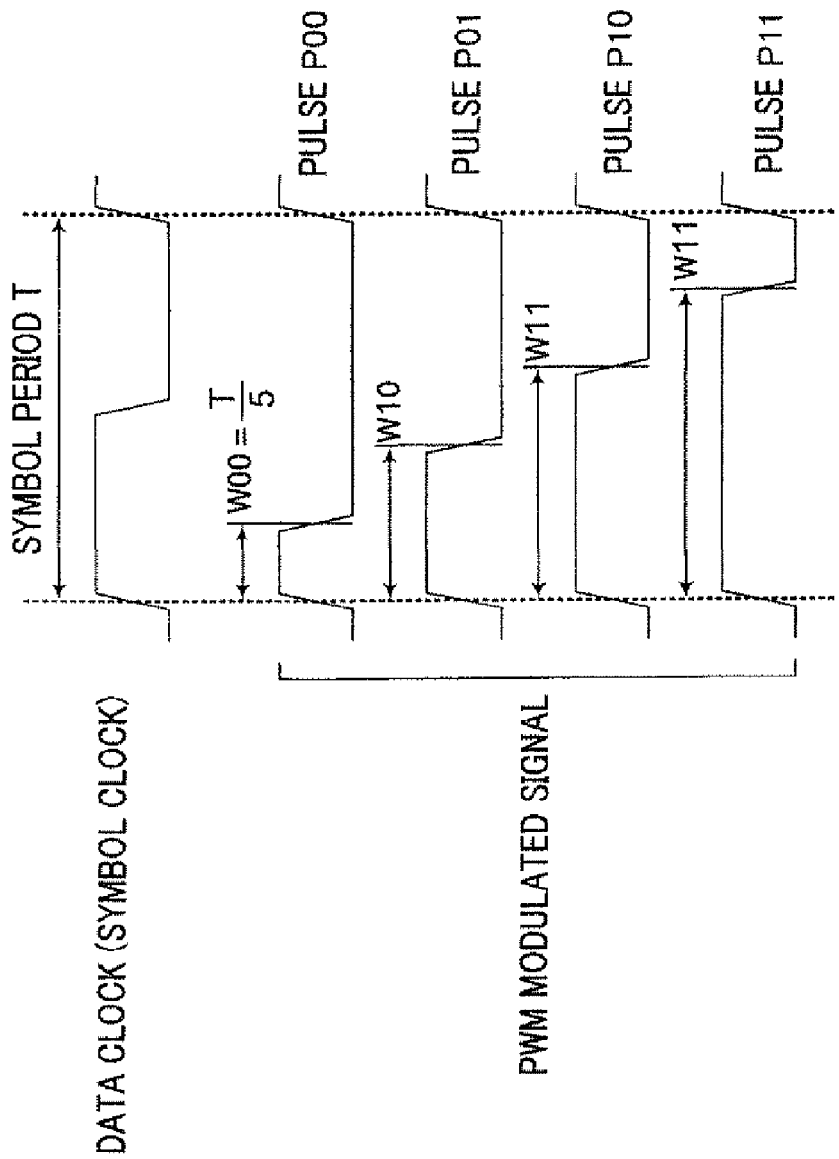
FIG. 1 shows a conventional transmission format of a PWM modulated signal.
Figure 2:
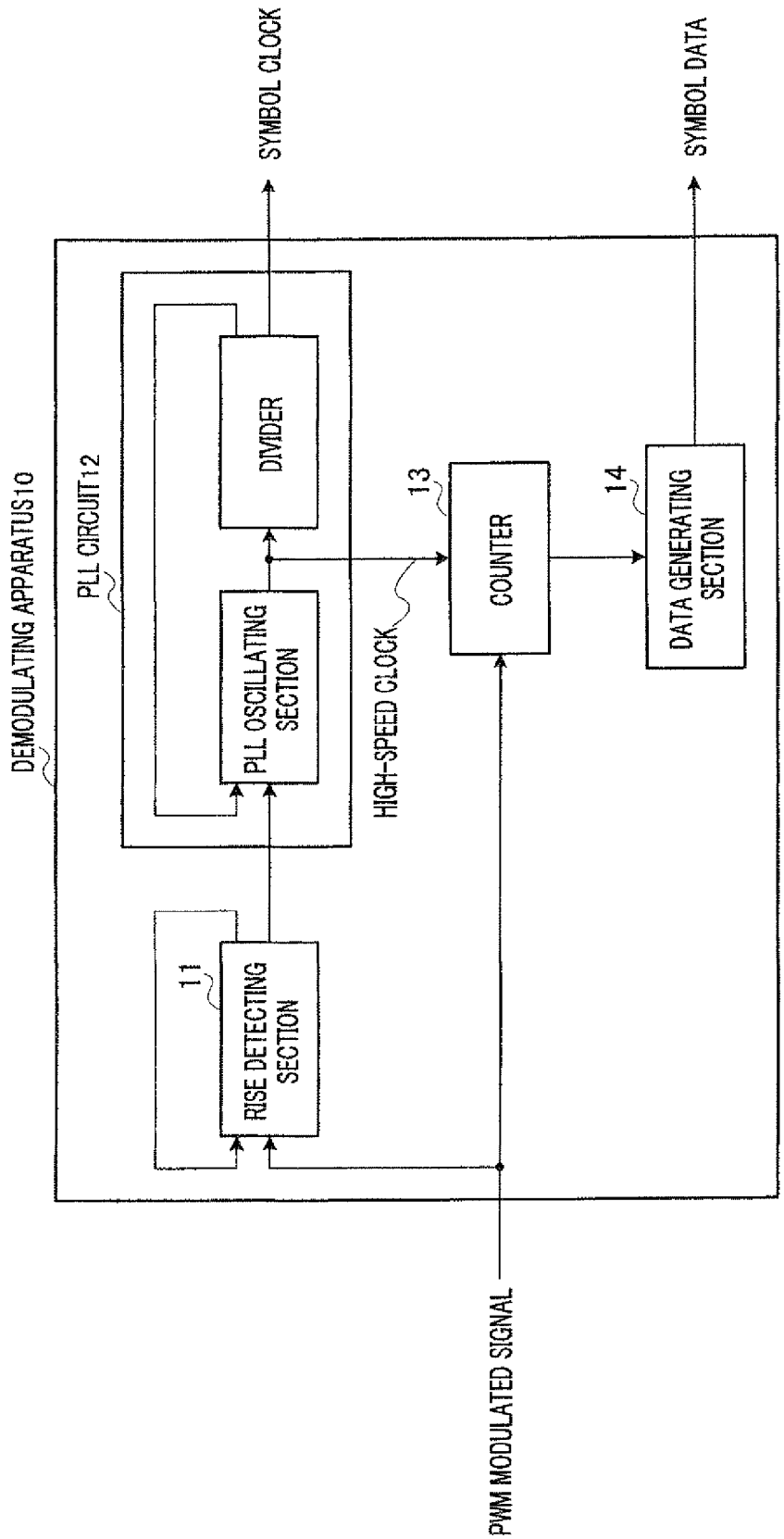
FIG. 2 is a block diagram showing a main configuration of a conventional demodulating apparatus.
Figure 3:
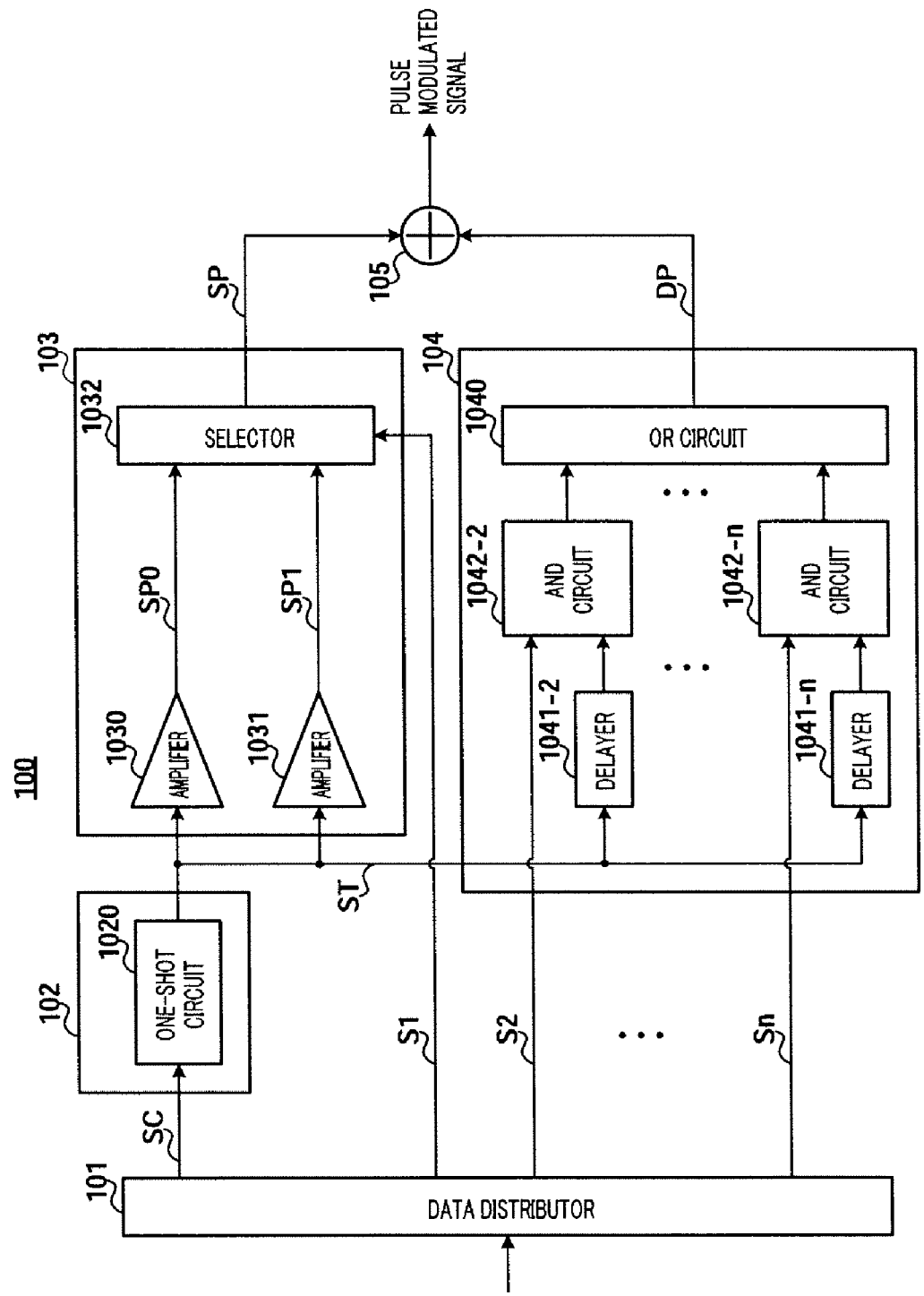
FIG. 3 is a block diagram showing a main configuration of the pulse transmitting apparatus according to Embodiment 1 of the present invention.

FIG. 3 shows a main configuration of the pulse transmitting apparatus according to Embodiment 1 of the present invention. Pulse transmitting apparatus 100 shown in FIG. 3 has data distributor 101, symbol timing generating section 102, symbol pulse generating section 103, data pulse generating section 104 and adder 105. Data distributor 101 distributes n-bit data information assigned to one symbol, to n items of data S1, S2, . . . , Sn, and outputs data S1 to symbol pulse generating section 103. Further, data distributor 101 outputs data S2 to Sn to data pulse generating section 104. Furthermore, data distributor 101 outputs symbol clock SC to symbol timing generating section 102.

Symbol timing generating section 102 is composed of, for example, one-shot circuit 1020, when triggered by a rise of symbol clock SC, generates symbol timing ST that becomes "H" only during the period of pulse width Wp of the desired pulse signal and output symbol timing ST to symbol pulse generating section 103 and data pulse generating section 104. Further, symbol timing generating section 102 generates symbol timing ST of amplitude level α and pulse width Wp less than pulse slot period Tp. Further, pulse slots are obtained by dividing one symbol period Ts by n, and pulse slot period Tp is a one-n-th of one symbol period Ts.

Symbol pulse generating section 103 has amplifiers 1030 and 1031 and selector 1032. Amplifiers 1030 and 1031 amplify symbol timings ST with respective amplification factors and output resulting symbol pulses SP0 and SP1 to selector 1032. Further, amplifier 1030 amplifies the amplitude level of symbol pulse SP0 to β. Furthermore, amplifier 1031 amplifies the amplitude level of symbol pulse SP1 to γ. Selector 1032 selects one of symbol pulse SP0 and symbol pulse SP1 according the value of data S1 and outputs the result to adder 105 as symbol pulse SP.

For example, if data S1 is "0," selector 1032 selects symbol pulse SP0 as symbol pulse SP, and, if data S1 is "1," selector 1032 selects symbol pulse SP1 as symbol pulse SP. That is, symbol pulse generating section 103 generates symbol pulse SP of amplitude level β if data S1 assigned to the head pulse slot is "0" and generates symbol pulse SP of amplitude level γ if data S1 is "1," and outputs symbol pulse SP to adder 105.

Data pulse generating section 104 has delayers 1041-2 to 1041-n, AND circuits 1042-2 to 1042-n and OR circuit 1040. Delayer 1041-2 delays symbol timing ST by pulse slot Tp, and AND circuit 1042-2 performs a logical AND operation of delayed symbol timing ST and data S2, and outputs the logical AND operation result to OR circuit 1040.

Similarly, delayer 1041-k (k=3 to n) delays symbol timing ST by (pulse slot Tp×(k−1)), and AND circuit 1042-k performs a logical AND operation of delayed symbol timing ST and data Sk. That is, AND circuit 1042-k assigns data Sk to pulse slot k by the logical AND operation. AND circuit 1042-k outputs data Sk assigned to pulse slot k to OR circuit 1040.

OR circuit 1040 performs a logical OR operation of data Sk outputted from AND circuits 1042-2 to 1042-n. That is, by a logical OR operation, OR circuit 1040 generates data pulse DP by assigning data Sk to pulse slot k (k=2 to n). That is, data pulse generating section 104 generates data pulse DP of amplitude level 0 in pulse slot k if data Sk is "0" and generates data pulse DP of amplitude level α in pulse slot k, and outputs data pulse DP to adder 105.

Adder 105 adds symbol pulse SP and data pulse DP and outputs the resulting pulse modulated signal.

Figure 4:
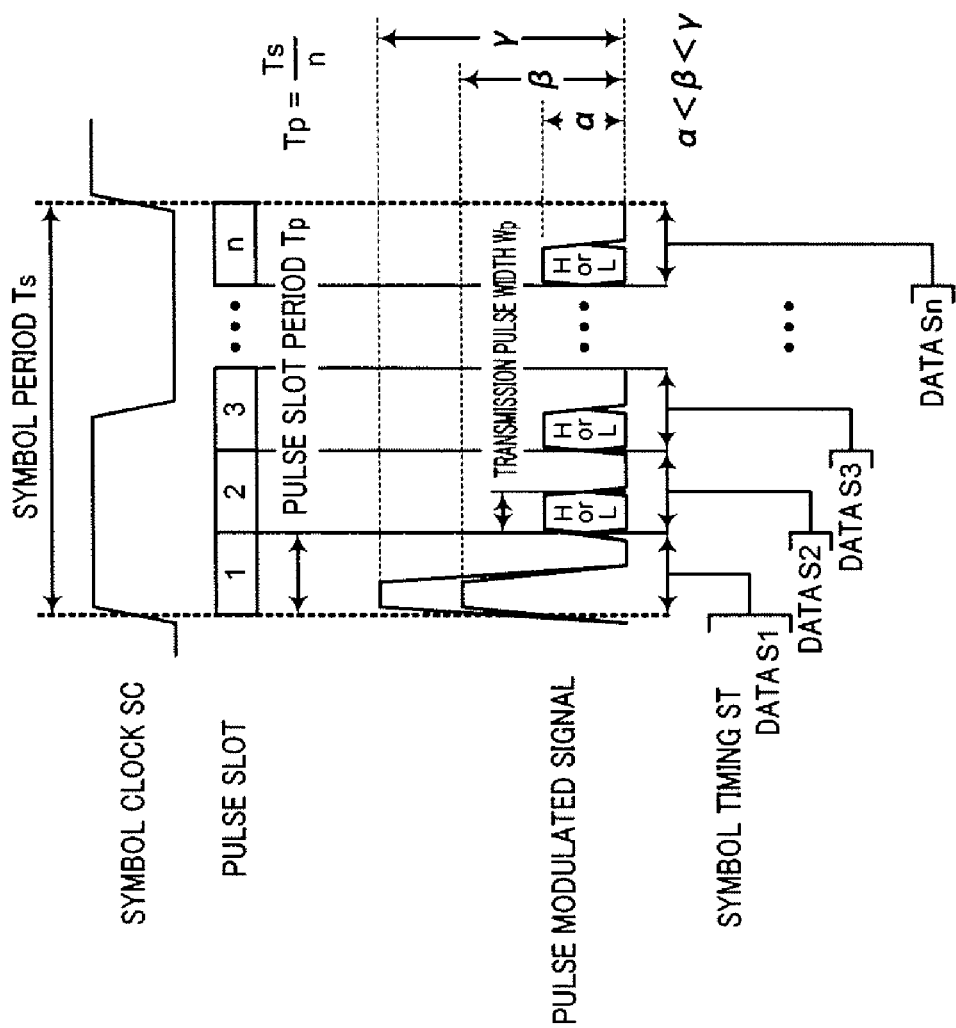
FIG. 4 shows a pulse transmission format of a pulse modulated signal according to Embodiment 1.

Next, the relationship between the pulse transmission format used in the present embodiment and the amplitude level will be described using FIG. 4. As shown in FIG. 4, the pulse transmission format used in the present embodiment is composed of n pulse slots dividing symbol period Ts into n, where symbol timing ST and data S1 are assigned to the head pulse slot and data S2 to Sn are assigned to the subsequent pulse slots other than the head pulse slot.

Then, in the head pulse slot interval, the amplitude level of the pulse modulated signal is β if data S1 is "0," and the amplitude level of the pulse modulated signal is γ if data S1 is "1." Further, in the subsequent pulse slot intervals, the amplitude levels of the pulse modulated signal are "0" if data S2 to Sn are "0," and the amplitude levels of the pulse modulated signal are α if data S2 to Sn are "1." In this case, the relationship between amplitude levels hold the relationship of α<β<γ.

That is, regardless of the values of data S1 assigned in the head pulse slot interval and data S2 to Sn assigned in the subsequent pulse slot intervals, the amplitude level of the pulse modulated signal in the head pulse slot interval is set greater at all times than the amplitude levels of the pulse modulated signal in the subsequent pulse slot intervals.

As described above, given that data Sk (k=1 to n) is all assigned to pulse slot k using symbol timing ST as the reference, the receiving end is able to acquire synchronization with the pulse modulated signal by detecting only symbol timing ST.

Consequently, with the present embodiment, the amplitude level of the pulse modulated signal in the head pulse slot interval in which symbol timing ST is superimposed, is set greater than the amplitude levels of the pulse modulated signal in the subsequent pulse slot intervals. By this means, it is easy to detect symbol timing ST at the receiving end, so that it is possible to demodulate the pulse modulated signal in a more reliable manner.

Figure 5:
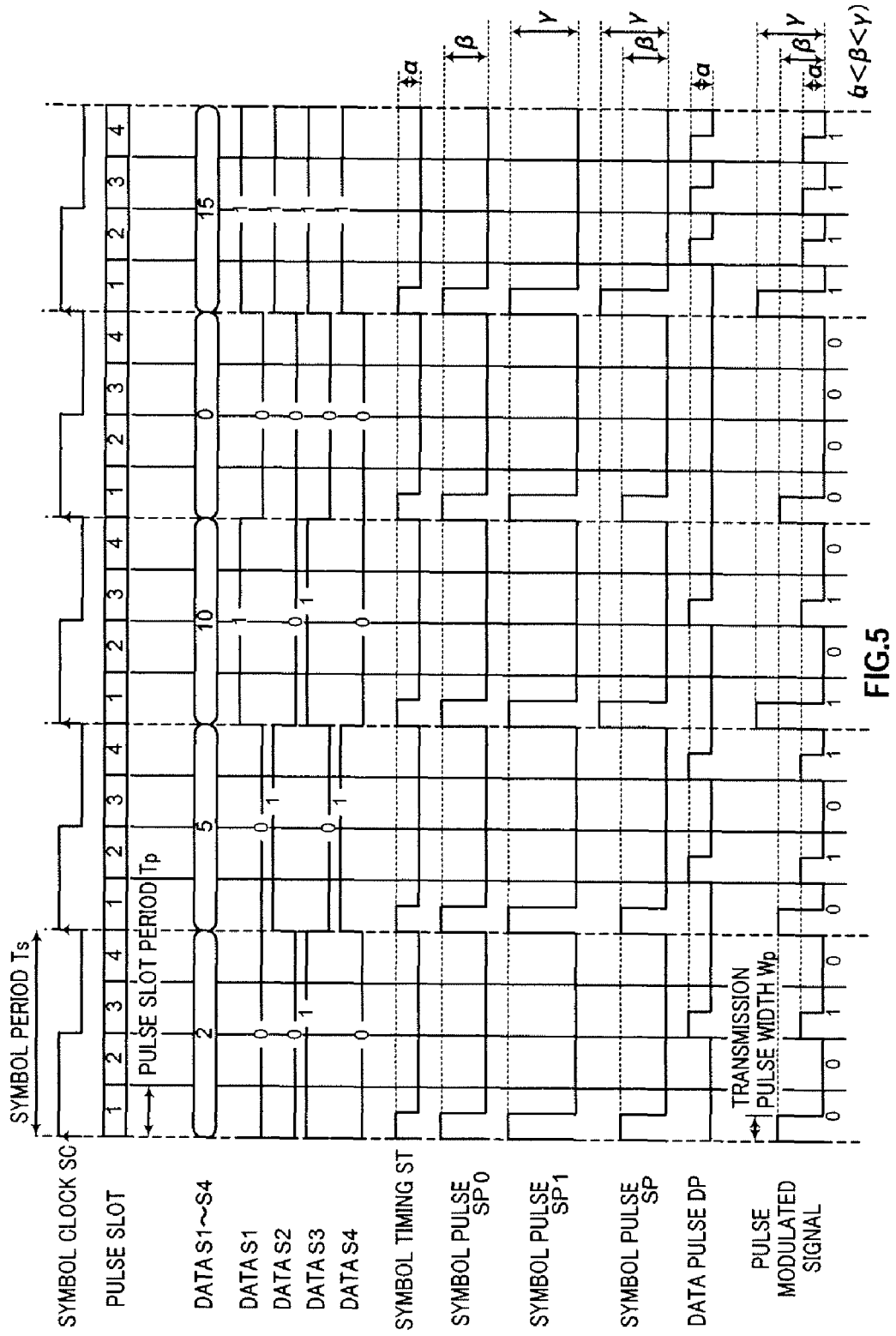
FIG. 5 is a time chart illustrating the operation of the pulse transmitting apparatus according to Embodiment 1.

Next, the operation of pulse transmitting apparatus 100 configured as described above will be described using the timing chart of FIG. 5. FIG. 5 shows an example of a case where four-bit data information is assigned to one symbol and data information is assigned to the pulse slots having pulse slot period Tp of a one-fourth of one symbol period Ts. Further, the following description will assume a case where n-bit data information is assigned to one symbol period Ts.

First, data information is distributed by data distributor 101 to data S1 to Sn, data S1 is outputted to selector 1032 of symbol pulse generating section 103 and data S2 to Sn are outputted to delayers 1041-2 to 1041-n of data pulse generating section 104.

On the other hand, when triggered by a rise of symbol clock SC, one-shot circuit 1020 of symbol timing generating section 102 generates symbol timing ST that becomes "H" only during the period of the pulse width of the desired pulse signal. Generated symbol timing ST is outputted to symbol pulse generating section 103 and data pulse generating section 104.

Then, amplifiers 1030 and 1031 of symbol pulse generating section 103 amplify the amplitude values of symbol timing ST to β and γ, and outputs amplified symbol pulses SP0 and SP1 to selector 1032.

Further, according to data S1, selector 1032 selects either β or γ as the amplitude level of the pulse modulated signal assigned to the head pulse slot interval. To be more specific, β is selected as the amplitude level if data S1 is "0" and γ is selected as the amplitude level if data S1 is "1." That is, according to data S1, either symbol pulse SP0 of amplitude level β or symbol pulse SP1 of amplitude level γ is selected and outputted to adder 105.

Delayer 1041-k (k=2 to n) of data pulse generating section 104 delays symbol timing ST by (pulse slot width Tp×(k−1)) and outputs the result to AND circuit 1042-k. Further, AND circuit 1042-k (k=2 to n) performs a logical AND operation of delayed symbol timing ST and data Sk and outputs the logical AND operation result to OR circuit 1040. Furthermore, OR circuit 1040 performs a logical OR operation of each operation result and generates the pulse modulated signal in which data S2 to Sn are assigned to the subsequent pulse slots. The generated pulse modulated signal is outputted to adder 105 as data pulse DP. The amplitude level of data pulse DP becomes 0 or α according to data Sk.

That is, by means of the logical AND operation and the logical OR operation, to be more specific, in a case where data Sk (k=2 to n) is "1" or in a case where the pulse modulated signal of amplitude level α is assigned to pulse slot k and data Sk is "0," the subsequent pulse slots, in which the pulse modulated signal of amplitude level 0 is assigned to pulse slot k, that is, data pulse DP, are generated.

Then, adder 105 combines symbol pulse SP and data pulse DP, that is, the head pulse slot and the subsequent pulse slots, and generates a pulse modulated signal forming one symbol.

As described above, according to the present embodiment, by using only symbol timing ST as the reference clock, the amplitude level of symbol pulse SP assigned to the head pulse slot in which symbol timing ST is superimposed can be set greater than data pulse DP assigned to the subsequent pulse slots other than the head pulse slot, and the amplitude level of symbol pulse SP can be changed according to data S1 assigned to the head pulse slot. Consequently, the receiving end is able to detect symbol timing ST required for synchronization in a reliable manner, acquire synchronization with the pulse modulated signal only at detected symbol timing ST and perform demodulation.

Further, only symbol timing ST is used as the reference clock and a multiply clock signal of symbol period Ts is not necessary, so that, even when the transmission rate becomes high-speed, it is possible to generate the pulse modulated signal with a comparatively simple configuration. Further, symbol timing ST and data information S1 can be superimposed in the head pulse slot, so that it is possible to prevent deterioration of transmission efficiency.

Furthermore, although, with the above description, symbol timing generating section 102 is composed of one-shot circuit 1020, symbol timing ST may be generated using delayers and AND circuits. To be more specific, by delaying symbol clock SC by pulse width Wp of a desired pulse signal by a delayer and performing a logical AND operation of symbol clock SC before delaying and symbol clock SC' after delaying, symbol timing ST may be generated. By so doing, the pulse width at symbol timing ST can be adjusted accurately, so that it is possible to support a case where the transmission rate becomes high-speed and pulse slot period Tp shortens.

(Embodiment 2)

The main configuration of pulse transmitting apparatus 100 according to Embodiment 2 is the same as in pulse transmitting apparatus 100 shown in FIG. 3, and the difference is that one-shot circuit 1020 generates symbol timing ST with a pulse width equal to the pulse slot period. That is, with the present embodiment, a pulse modulated signal of the same pulse width as the pulse slot period is transmitted.

One-shot circuit 1020 changes the time constant, adjusts the time for generating an "H" pulse, and generates symbol timing ST that becomes "H" only during the period equal to the pulse slot period.

Figure 6:
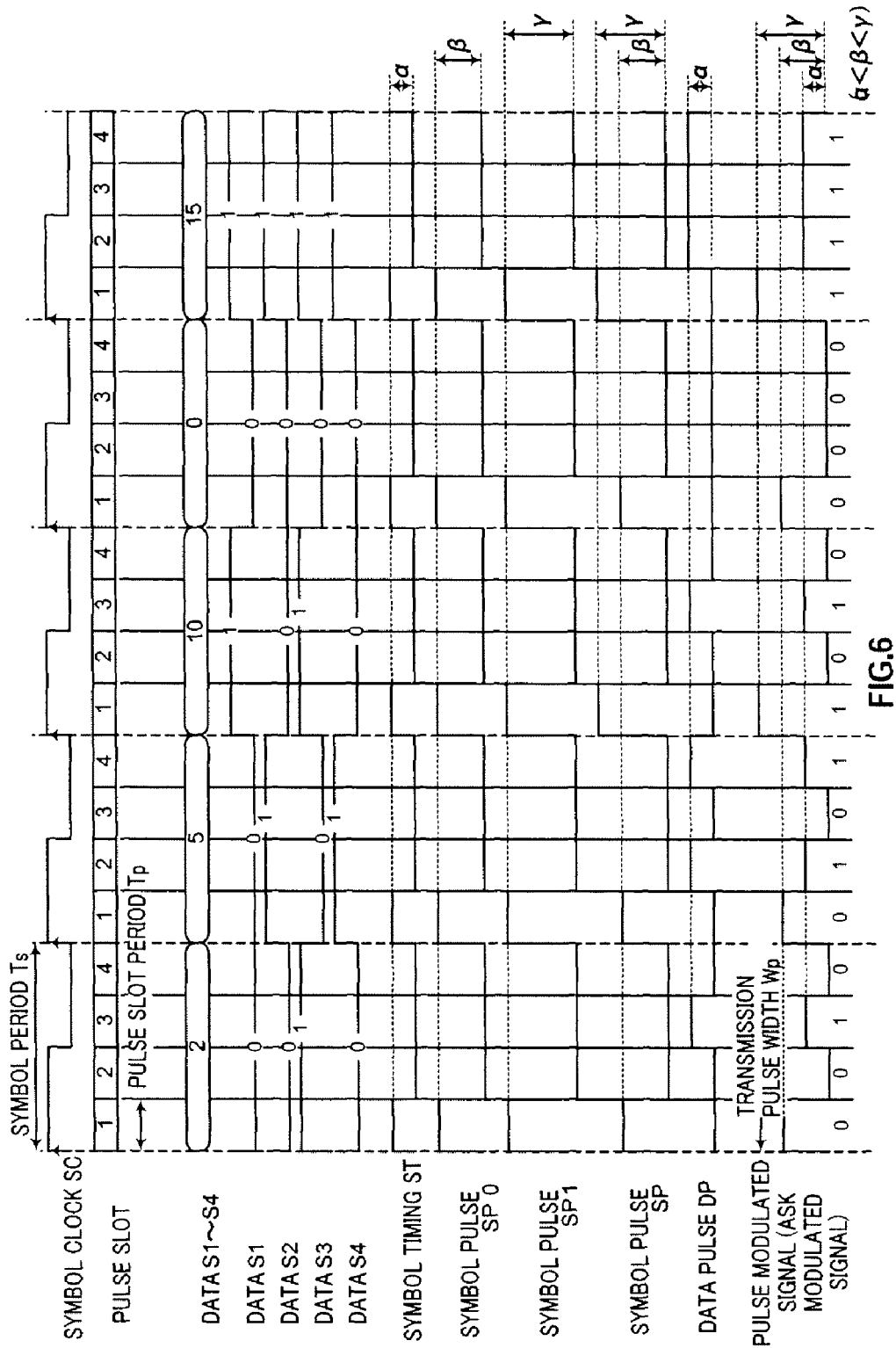
FIG. 6 is a time chart illustrating the operation of the pulse transmitting apparatus according to Embodiment 2 of the present invention.

Hereinafter, the operation of pulse transmitting apparatus 100 configured as described above will be described using the timing chart of FIG. 6. FIG. 6 is an example of a case where four-bit data information is assigned to one symbol and data information is assigned to the pulse slots having pulse slot period Tp of a one-fourth of one symbol period Ts. Further, the following description will assume a case where n-bit data information is assigned to one symbol period Ts.

First, data distributor 101 distributes data information to data S1 to Sn, outputs data S1 to selector 1032 of symbol pulse generating section 103 and outputs data S2 to Sn to delayers 1041-2 to 1041-n of data pulse generating section 104, respectively.

On the other hand, when triggered by a rise of symbol clock SC, one-shot circuit 1020 of symbol timing generating section 102 generates symbol timing ST that becomes "H" only during the period equal to the width of the pulse slot and outputs generated symbol timing ST to symbol pulse generating section 103 and data pulse generating section 104.

Hereinafter, as in above Embodiment 1, amplifiers 1030 and 1031 of symbol pulse generating section 103 amplify the amplitude values of symbol timing ST to β and γ. Further, according to data S1, selector 1032 selects either β or γ as the amplitude level of the pulse modulated signal assigned in the head pulse slot interval.

Then, delayer 1041-k (k=2 to n) of data pulse generating section 104 delays symbol timing ST by (pulse slot width Tp×(k−1)) and outputs the result to AND circuit 1042-k. Further, AND circuit 1042-k (k=2 to n) performs a logical AND operation of delayed symbol timing ST and data Sk, and outputs the arithmetic operation result to OR circuit 1040. Then, OR circuit 1040 performs a logical OR operation of each arithmetic operation result and outputs the result to adder 105. Further, adder 105 combines the head pulse slot and the subsequent pulse slots and generates a pulse modulated signal forming one symbol.

The pulse modulated signal generated in this way is a pulse modulated signal of a pulse width having the same time width as pulse slot period Tp shown in FIG. 6, that is, an ASK modulated signal.

As described above, by changing the time constant of one-shot circuit 1020, the present embodiment is able to support the ASK modulation scheme with a comparatively simple configuration, without increasing the circuit scale.

Further, although, with the above description, symbol timing generating section 102 is composed of one-shot circuit 1020, symbol timing ST may be generated using delayers and AND circuits. To be more specific, by delaying symbol clock SC by pulse slot period Tp by a delayer and performing a logical AND operation of symbol clock SC before delaying and symbol timing SC' after delaying, symbol timing ST may be generated. By so doing, the pulse width for symbol timing ST can be adjusted accurately, so that it is possible to support a case where the transmission rate becomes high-speed and pulse slot period Tp shortens.

(Embodiment 3)

Figure 7:
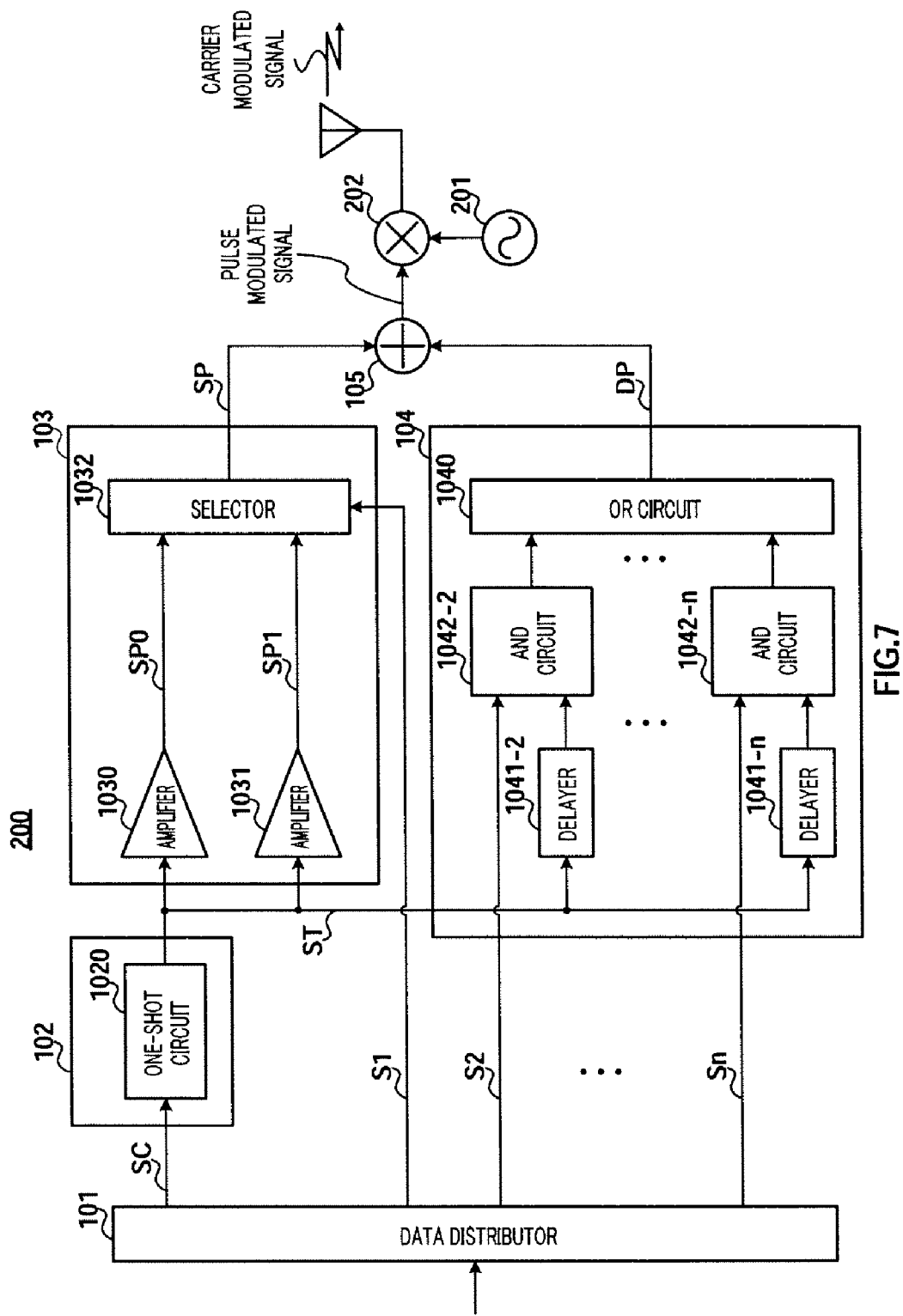
FIG. 7 is a block diagram showing a main configuration of the pulse transmitting apparatus according to Embodiment 3 of the present invention.

FIG. 7 shows a main configuration of pulse transmitting apparatus 200 according to Embodiment 3 of the present invention. In FIG. 7, the same components as in FIG. 3 will be assigned the same reference numerals and repetition of description will be omitted. FIG. 7 shows a configuration that adds oscillator 201 and mixer 202 compared to FIG. 3.

Oscillator 201 generates a carrier signal and outputs the carrier signal to mixer 202.

Mixer 202 multiplies the pulse modulated signal outputted from adder 105 by the carrier signal and generates a radio frequency pulse modulated signal (hereinafter "carrier modulated signal").

Figure 8:
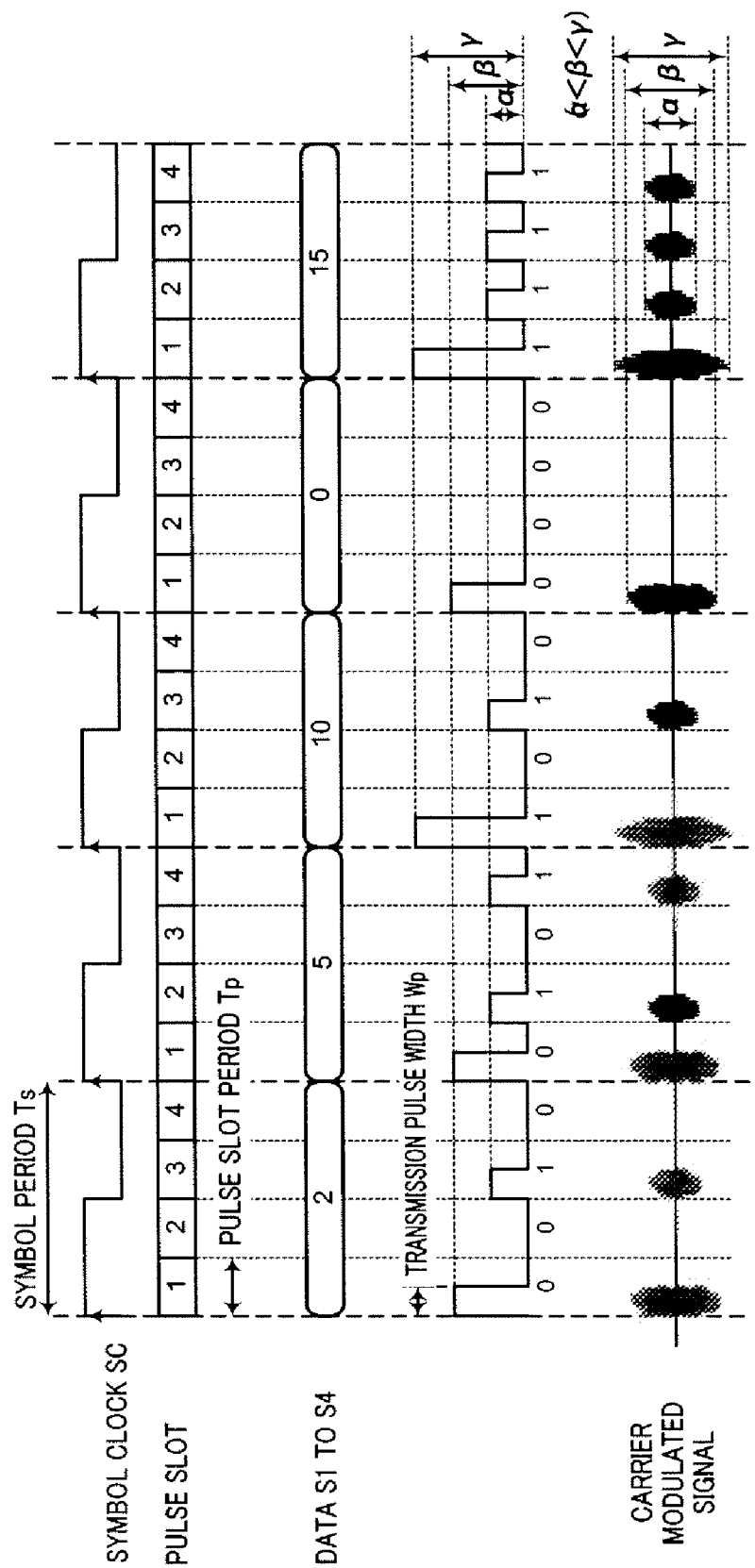
FIG. 8 is a time chart illustrating the operation of the pulse transmitting apparatus according to Embodiment 3.

Next, the operation of pulse transmitting apparatus 200 configured as described above will be described using the timing chart of FIG. 8. FIG. 8 shows an example of a case where four-bit data information is assigned to one symbol and data information is assigned to the pulse slots having pulse slot period Tp of a one-fourth of one symbol period Ts. Further, the following description will assume a case where n-bit data information is assigned to one symbol period Ts.

As described above, data distributor 101 to adder 105 generate a pulse modulated signal with an amplitude value selected depending on symbol timing ST and data S1 to Sn.

Then, mixer 202 multiplies the pulse modulated signal outputted from adder 105 by the carrier signal outputted from oscillator 201 and generates a radio frequency pulse modulated signal (carrier modulated signal). The amplitude level of the carrier modulated signal becomes one of α, β and γ, depending on the amplitude level of the pulse modulated signal as shown in FIG. 8.

As described above, according to the present embodiment, by providing oscillator 201 and mixer 202, a carrier modulated signal can be generated using a carrier signal with a comparatively simple configuration, without using a complicated circuit, so that it is possible to support pulse communication in the radio frequency band.

Further, although FIG. 8 shows an example of a case where the amplitude level of a carrier modulated signal and the amplitude level of a pulse modulated signal are the same, the present invention is not limited to the case where the amplitude level of a carrier modulated signal and the amplitude level of a pulse modulated signal are the same, and it is equally possible to increase or decrease the amplitude level of the carrier modulated signal as long as the relationship of $\alpha < \beta < \gamma$ is maintained.

Further, by making the pulse width of the carrier modulated signal the same as pulse slot period Tp, the carrier modulated signal may be generated using an ASK modulated signal.

(Embodiment 4)

Figure 9:
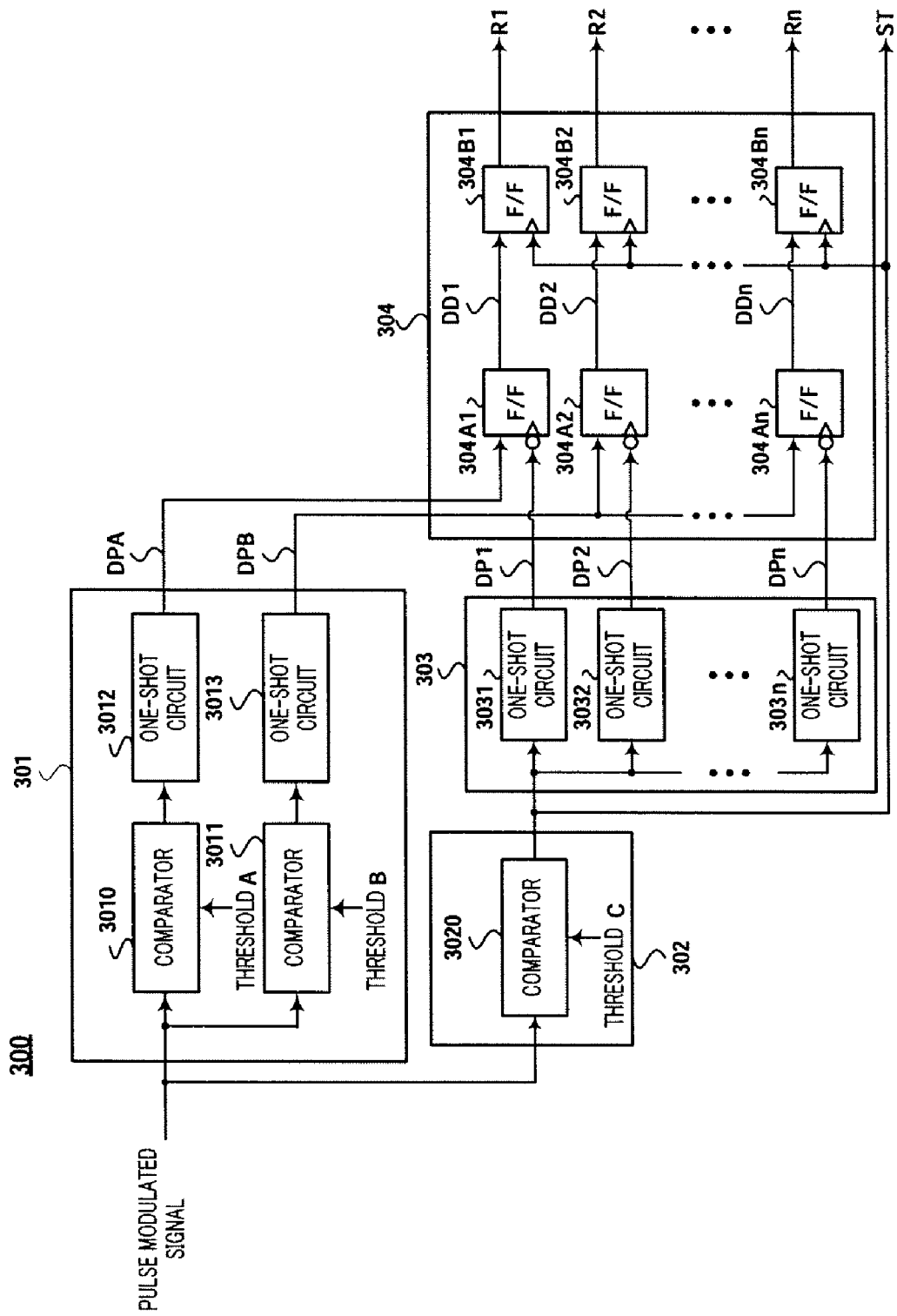
FIG. 9 is a block diagram showing a main configuration of the pulse receiving apparatus according to Embodiment 4 of the present invention.

FIG. 9 shows a main configuration of the pulse receiving apparatus according to Embodiment 4 of the present invention. Pulse receiving apparatus 300 shown in FIG. 9 receives and demodulates the pulse modulated signal transmitted from pulse transmitting apparatus 100 according to Embodiment 1.

Pulse receiving apparatus 300 has data pulse detecting section 301, symbol timing detecting section 302, identification pulse generating section 303 and data generating section 304.

Data pulse detecting section 301 is composed of comparators 3010 and 3011 and one-shot circuits 3012 and 3013.

Comparator 3010 compares the amplitude level of the pulse modulated signal with threshold A and converts the amplitude level into a binary digital signal. Similarly, comparator 3011 compares the amplitude level of the pulse modulated signal with threshold B and converts the amplitude level into a binary digital signal. The threshold of each comparator is set such that amplitude levels $\alpha$, $\beta$ and $\gamma$ set at the transmitting end can be identified.

To be more specific, threshold A is set to satisfy $\beta < A < \gamma$ to identify $\beta$ and $\gamma$, and threshold B is set to satisfy $0 < B < \alpha$ to identify 0 and $\alpha$. Comparators 3010 and 3011 output digital signals resulting from threshold decision, to one-shot circuits 3012 and 3013. Further, 0 is the amplitude level when data Sk (k=2 to n) assigned to the subsequent pulse slots is "0," $\alpha$ is the amplitude level when data Sk (k=2 to n) assigned to the subsequent pulse slots is "1," $\beta$ is the amplitude level when data S1 assigned to the head pulse slot is "1," and $\gamma$ is the amplitude level when data S1 assigned to the head pulse slot is "1."

When triggered by a rise of the digital signal, one-shot circuits 3012 and 3013 generate data pulses DPA and DPB that become "H" only during the period of pulse slot period Tp and output data pulses DPA and DPB to data generating section 304.

In this way, comparator 3010 and one-shot circuit 3012 extract data S1 assigned to the head pulse slot, and comparator 3011 and one-shot circuit 3013 extract data Sk (k=2 to n) assigned to the subsequent pulse slots.

Symbol timing detecting section 302 is composed of comparator 3020. Comparator 3020 compares the amplitude level of the pulse modulated signal with threshold C, and converts the result into a binary digital signal. In this case, by setting the value of threshold C to satisfy the relationship of $\alpha < C < \beta$, it can be decided that the slot position is the subsequent pulse slots if the amplitude level of the pulse modulated signal is less than threshold C and it can be decided that the slot position is the head pulse slot if the amplitude level of the pulse modulated signal is greater than threshold C.

As described above, pulse transmitting apparatus 100 performs transmission by assigning symbol timing ST only to the head pulse slot, so that the position of the head pulse slot can be learned by performing threshold decision and symbol timing ST can be detected. Symbol timing detecting section 302 outputs detected symbol timing ST to identification pulse generating section 303 and data generating section 304.

Figure 10:
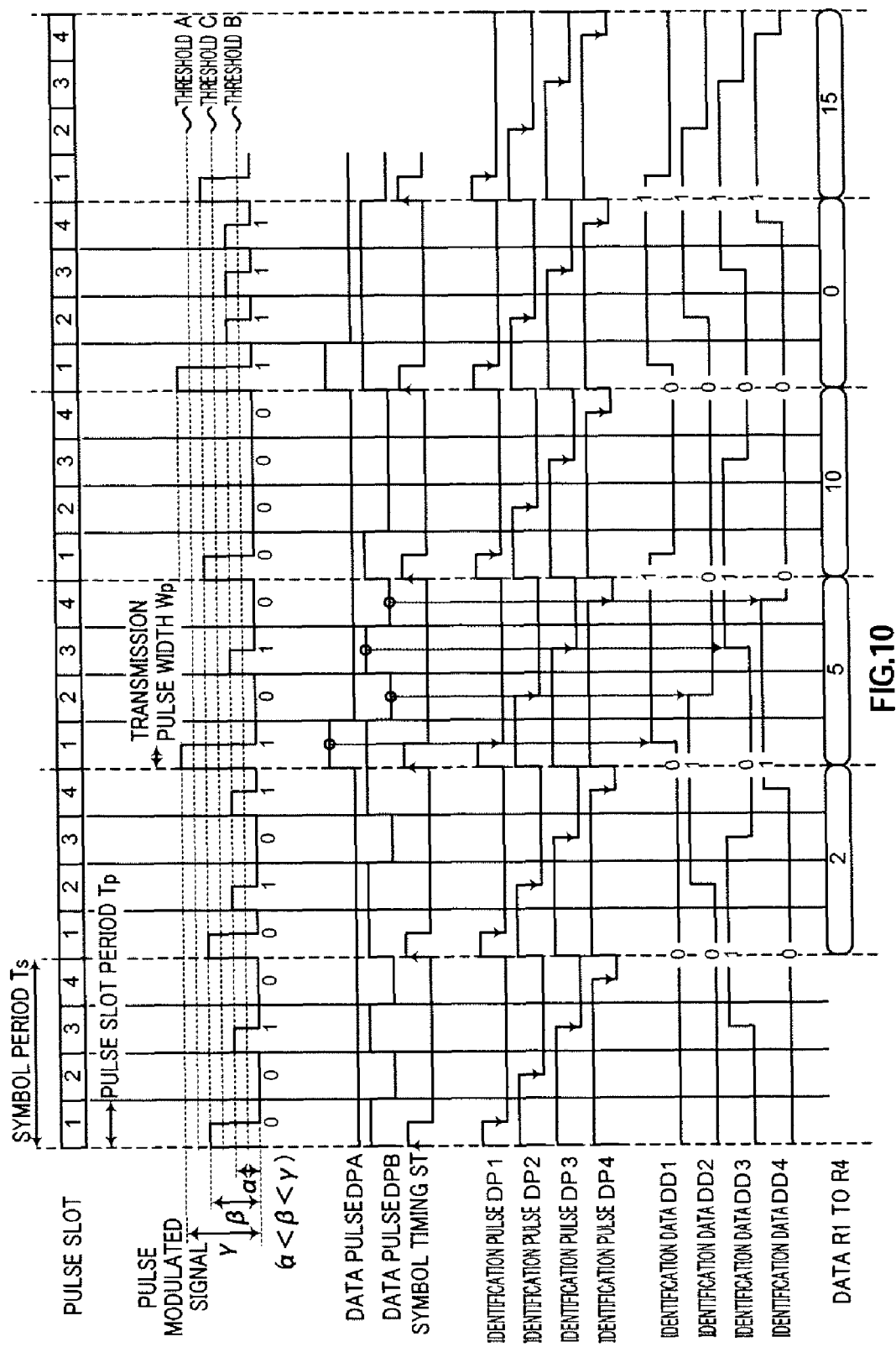
FIG. 10 is a time chart illustrating the operation of the pulse receiving apparatus according to Embodiment 4.

Identification pulse generating section 303 is composed of one-shot circuits 3031 to 303n, and when triggered by a rise of symbol timing ST, one-shot circuits 3031 to 303n generate n identification pulses DP1 to DPn of different pulse widths. FIG. 10 is a timing chart of identification pulses DP1 to DPn. As shown in FIG. 10, identification pulse generating section 303 generates identification pulses DP1 to DPn where a trailing is located near the center of each pulse slot, and outputs identification pulses DP1 to DPn to data generating section 304.

Data generating section 304 is composed of flip flops (F/F) 304A1 to 304An and 304B1 to 304Bn.

Flip flop 304A1 samples data pulse DPA outputted from one-shot circuit 3012 at the trailing edge of identification pulse DP1, and outputs sampled identification data DD1 to flip flop 304B1.

Flip flops 304A2 to 304An sample data pulse DPB outputted from one-shot circuit 3013 at the trailing edges of identification pulses DP2 to DPn, and output sampled identification data DD2 to DDn to flip flops 304B2 to 304Bn.

Flip flops 304B1 to 304Bn acquire phase synchronization with identification data DD1 to DDn at the rising edge of symbol timing ST and demodulate data R1 to Rn formed with bits assigned to one symbol.

Next, the operation of pulse receiving apparatus 300 configured as described above will be described using the timing chart of FIG. 10 again. FIG. 10 is an example of the timing chart of a pulse modulated signal assigned per pulse slot obtained by dividing one symbol timing period Ts is divided into four. Further, the following description will assume a case where data information is assigned per pulse slot obtained by dividing one symbol period Ts into n pulse slots.

The pulse modulated signal transmitted from pulse transmitting apparatus 100 (not shown) is outputted to data pulse detecting section 301 and symbol timing detecting section 302. Then, comparator 3010 of data pulse detecting section 301 performs threshold decision to decide whether or not the amplitude level of a pulse modulated signal is greater than threshold A, and converts the amplitude level into a binary digital signal. The binary digital signal after conversion is outputted to one-shot circuit 3012, a rise of the detected pulse triggers generation of an "H" pulse only during the period of pulse slot period Tp, and generated data pulse DPA is outputted to flip flop 304A1 of data generating section 304.

As described above, given that threshold A is set to satisfy $\beta < A < \gamma$, data pulse DPA generated by comparator 3010 shows data S1 assigned to the head pulse slot.

Similarly, comparator 3011 of data pulse detecting section 301 performs threshold decision of the pulse modulated signal to decide whether or not the amplitude level of the pulse modulated signal is greater than threshold B, and converts the amplitude level into a binary digital signal. The binary digital signal after conversion is outputted to one-shot circuit 3013, a rise of the detected pulse triggers generation of an "H" pulse only during the period of pulse slot period Tp and generated data pulse DPB is outputted to flip flops 304A2 to 304An of data generating section 304.

Given that threshold B is set to satisfy $0 < B < \alpha$, the head pulse slot of data pulse DPB becomes an "H" pulse at all times, and the subsequent pulse slots show the values of data S2 to Sn assigned to the pulse slots.

Further, comparator 3020 of symbol timing detecting section 302 performs threshold decision of the pulse modulated signal to decide whether or not the amplitude level of a pulse modulated signal is greater than threshold C, and converts the amplitude level into a binary digital signal. Given that threshold C is set to satisfy $\alpha < C < \beta$ as described above, the region that is decided greater than threshold C by threshold decision means the head slot to which the symbol timing is assigned.

In this way, symbol timing detecting section 302 detects symbol timing ST, and detected symbol timing ST is outputted to one-shot circuits 3031 to 303n of identification pulse generating section 303 and to flip flops 304B1 to 304Bn of data generating section 304.

When triggered by a rise of symbol timing ST, one-shot circuits 3031 to 303n of identification pulse generating section 303 generate n identification pulses DP1 to DPn of different pulse widths, and output generated identification pulses DP1 to DPn to flip flops 304A1 to 304An. Identification pulses DP1 to DPn have the trailing edges near the center of the pulse slots as shown in FIG. 10.

Then, flip flop 304A1 of data generating section 304 samples data pulse DPA at the trailing edge of identification pulse DP1, and flip flop 304B1 acquires phase synchronization of sampled identification data DD1 at the rising edge of symbol timing ST and demodulates identification data DD1 as data R1.

Similarly, flip flops 304A2 to 304An of data generating section 304 sample data pulse DPB at the trailing edges of identification pulses DP2 to DPn, and flip flops 304B2 to 304Bn acquire phase synchronization of sampled identification data DD2 to DDn at the rising edge of the symbol timing and demodulate identification data DD2 to DDn as data R2 to Rn.

As described above, according to the present embodiment, by performing threshold decision of the received pulse modulated signal using three thresholds (A, B and C: B<C<A), extracting symbol timing ST and data pulses DPA and DPB from the result of threshold decision, it is possible to demodulate data R1 to Rn by sampling data pulses DPA and DPB using resulting symbol timing ST.

Consequently, according to the present embodiment, a clock signal which is equal to pulse slot period Ts or higher-speed than pulse slot period Ts is not necessary, so that simplification, miniaturization and lower power consumption of the pulse receiving apparatus is realized without increasing the circuit scale.

Further, by performing threshold decision using different thresholds, it is possible to separate the symbol timing and data information arranged in the head pulse slot and prevent deterioration of transmission efficiency.

Furthermore, although, with the above description, identification pulse generating section 303 generates identification pulses DP1 to DPn using one-shot circuits 3031 to 303n, identification pulses DP1 to DPn may be generated using delayers and XOR circuits. To be more specific, identification pulses DP1 to DPn are generated by generating a timing signal dividing symbol timing ST into two by, for example, a flip flop and performing a logical XOR operation of this timing signal and a delay signal delayed by an arbitrary amount of delay by a delayer. In case of such a configuration, given that identification pulses DP1 to DPn can be generated accurately, even when the transmission rate becomes high-speed and pulse slot period Ts shortens, it is possible to make the pulse receiving apparatus that supports the high transmission rate.

Further, when the ASK modulated signal transmitted from pulse transmitting apparatus 100 according to Embodiment 2 is received, one-shot circuits 3012 and 3013 of data pulse detecting section 301 are not necessary and the ASK modulated signal can be demodulated with a comparatively simple configuration, without increasing the circuit scale.

(Embodiment 5)

Figure 11:
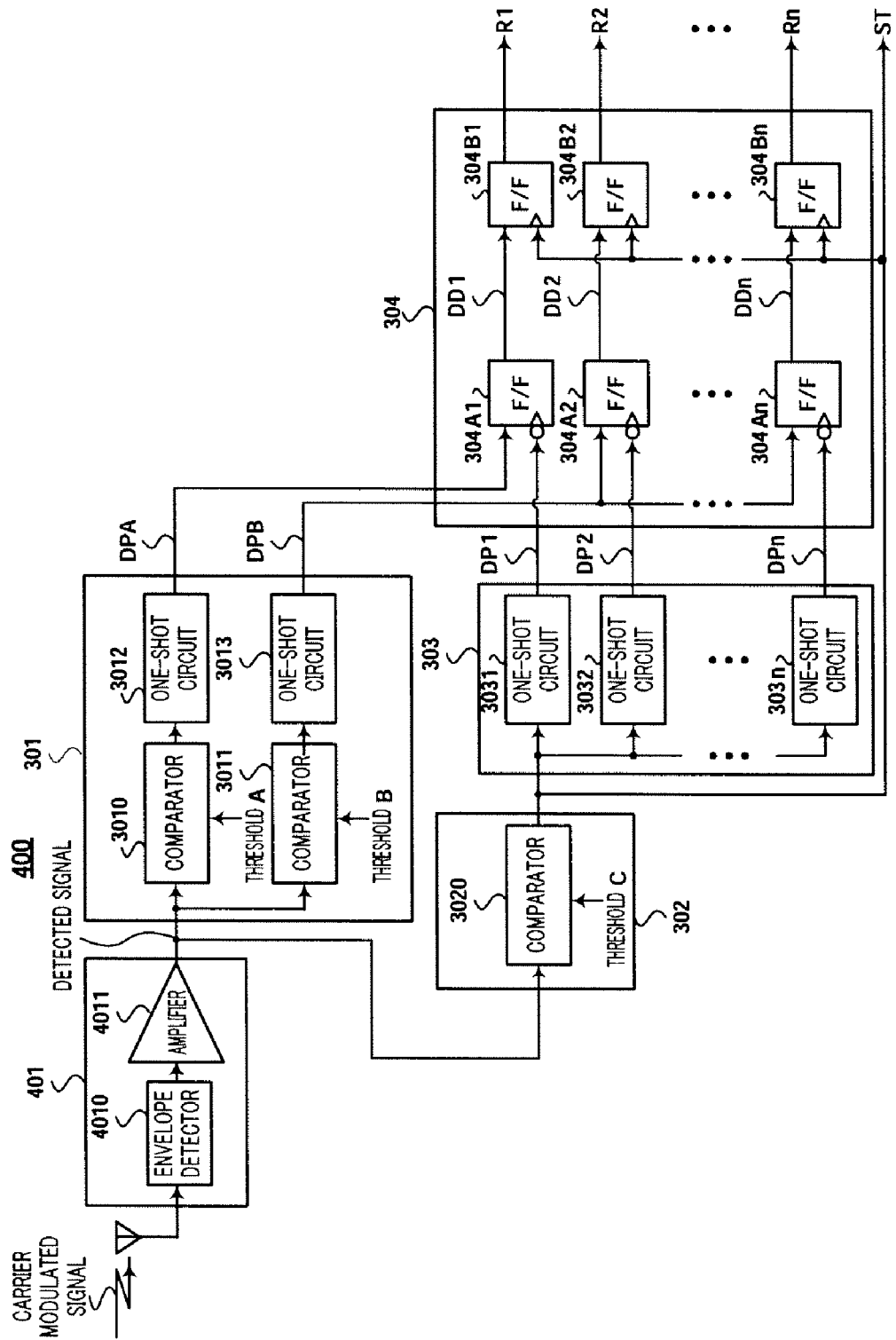
FIG. 11 is a block diagram showing a main configuration of the pulse receiving apparatus according to Embodiment 5 of the present invention.

FIG. 11 shows a main configuration of the pulse receiving apparatus according to Embodiment 5 of the present invention. Pulse receiving apparatus 400 shown in FIG. 11 receives and demodulates a carrier modulated signal transmitted from pulse transmitting apparatus 200 according to Embodiment 3. Further, in FIG. 11, the same components as in FIG. 9 will be assigned the same reference numerals and repetition of description will be omitted. FIG. 11 shows a configuration that adds detector 401 compared to FIG. 9.

Figure 12:
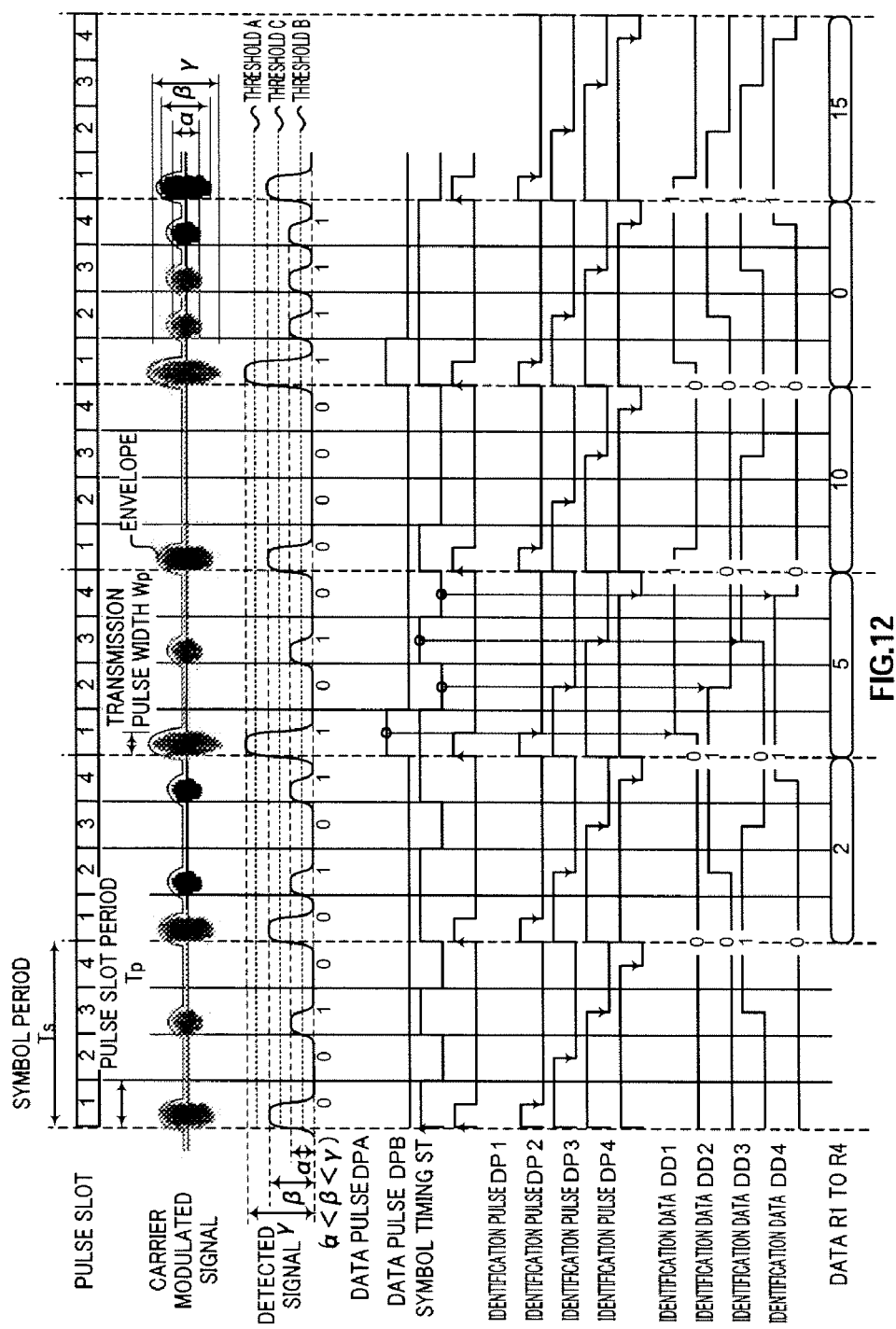
FIG. 12 is a time chart illustrating the operation of the pulse receiving apparatus according to Embodiment 5.

Detector 401 has envelope detector 4010 and amplifier 4011. Envelope detector 4010 detects an envelope of a carrier modulated signal, that is, a line connecting the maximum points of a modulated signal, and outputs the detected envelope to amplifier 4011. FIG. 12 shows a waveform of a detected signal. Envelope detector 4010 generally cuts off the negative portion of a carrier modulated signal by, for example, a diode, and performs asynchronous detection of an envelope by a low pass filter composed of, for example, a resistance and capacitor. Further, envelope detector 4010 may detect the envelope by synchronous detection.

Amplifier 4011 amplifies the detected envelope and outputs the amplified detected signal to data pulse detecting section 301 and symbol timing detecting section 302.

Hereinafter, similar to Embodiment 4, data pulse detecting section 301 generates data pulses DPA and DPB, symbol timing detecting section 302 detects symbol timing ST, and identification pulse generating section 303 and data generating section 304 demodulate data R1 to Rn.

As described above, according to the present embodiment, by providing detector 401, a carrier modulated signal modulated in the radio frequency band can be demodulated with a comparatively simple configuration, without preparing additional complicated circuits and radio pulse communication can be supported.

Further, although a case has been described with the above description where a carrier modulated signal that employs as pulse width Wp a time width shorter than pulse slot period Tp is received, in a case where a carrier modulated signal that employs as pulse width Wp a time width equal to pulse slot period Tp and that is subjected to ASK modulation is received as in pulse transmitting apparatus 100 according to Embodiment 2, it is possible to make a pulse receiving apparatus that supports the ASK modulation scheme with a comparatively simple configuration, without increasing the circuit scale, as long as one-shot circuits 3012 and 3013 of data pulse detecting section 301 are removed.

Furthermore, although amplitude levels α, β and γ of the carrier modulated signal decrease to half after passing envelope detector 4010 and therefore are amplified again by amplifier 4011 to amplitude levels α, β and γ, amplifier 4011 needs not to be used depending on the transmission amplitude level at the transmitting end and the accuracy in the comparator of data pulse detecting section 301 and symbol timing detecting section 302.

(Embodiment 6)

Figure 13:
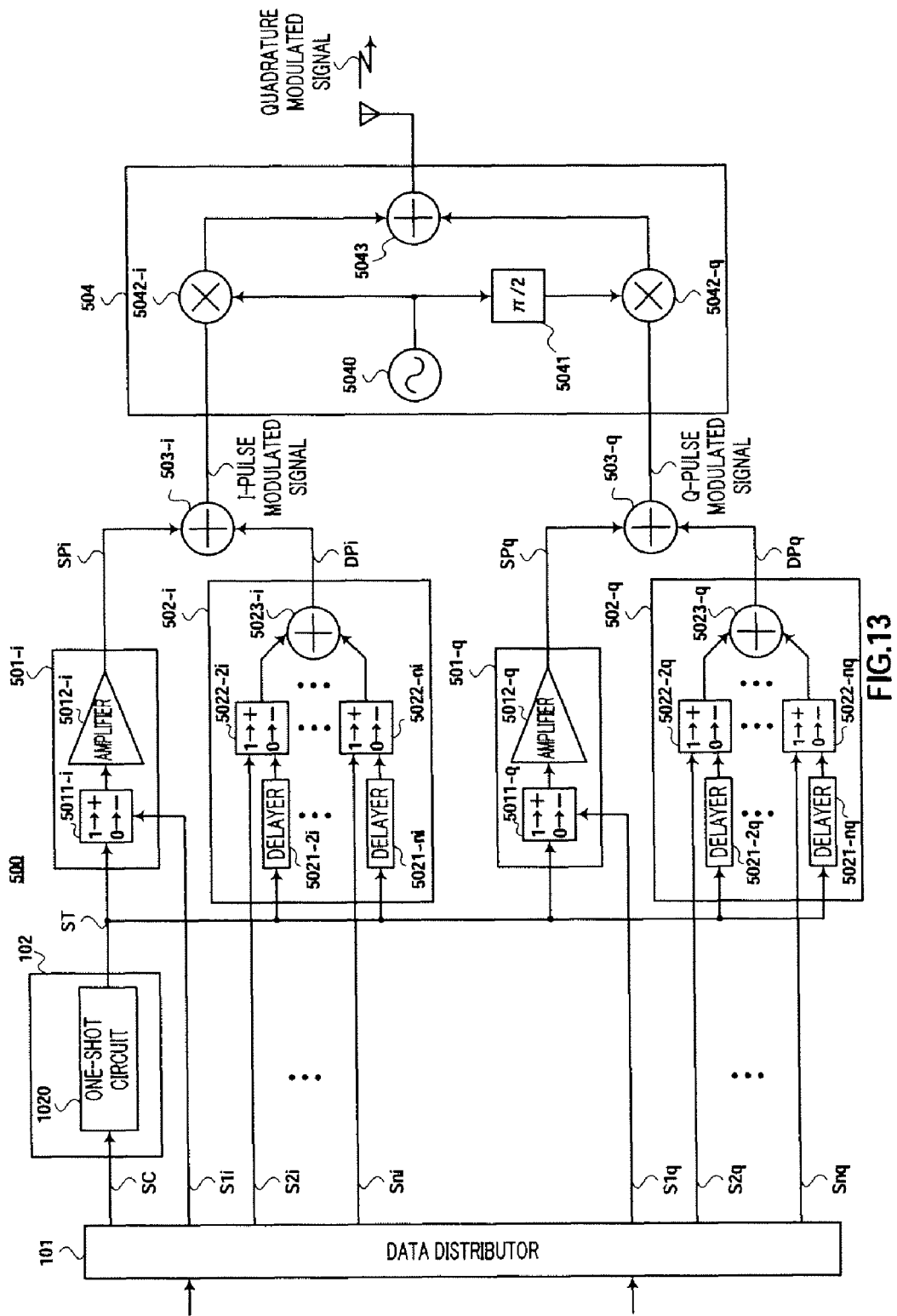
FIG. 13 is a block diagram showing a main configuration of the pulse transmitting apparatus according to Embodiment 6 of the present invention.

FIG. 13 shows a main configuration of the pulse transmitting apparatus according to Embodiment 6 of the present invention. For the description of the present embodiment, the same components as in FIG. 3 will be assigned the same reference numerals and repetition of description will be omitted. An example shows that the present embodiment is applied to a transmitting apparatus that transmits a QPSK modulated signal.

Pulse transmitting apparatus 500 shown in FIG. 13 has data distributor 101, symbol timing generating section 102, symbol pulse generating sections 501-$i$ and 501-$q$, data pulse generating sections 502-$i$ and 502-$q$, adders 503-$i$ and 503-$q$ and quadrature modulating section 504.

Data distributor 101 distributes n-bit data information assigned to one symbol each in the I-axis and the Q-axis, to n items of data S1$i$ to Sn$i$ and n items of data S1$q$ to Sn$q$, and outputs data S1$i$ to symbol pulse generating section 501-$i$, data S1$q$ to symbol pulse generating section 501-$q$, data S2$i$ to Sn$i$ to data pulse generating section 502-$i$ and data S2$q$ to Sn$q$ to data pulse generating section 502-$q$. Further, data distributor 101 outputs symbol clock SC to symbol timing generating section 102.

Symbol pulse generating section 501-$i$ has level converter 5011-$i$ and amplifier 5012-$i$, and level converter 5011-$i$ converts symbol timing ST into a positive and negative signal depending on the value of data S1$i$. Amplifier 5012-$i$ amplifies the amplitude level of symbol pulse SPi to $\beta$. Further, the value of $\beta$ is greater than amplitude level $\alpha$ of symbol timing ST.

Similarly, symbol pulse generating section 501-$q$ has level converter 5011-$q$ and amplifier 5012-$q$, and level converter 5011-$q$ converts symbol timing ST into a positive and negative signal depending on the value of data S1$q$. Amplifier 5012-$q$ amplifies the amplitude level of symbol pulse SPq to $\beta$.

In this way, symbol pulse generating sections 501-$i$ and 501-$q$ convert symbol timing ST into a positive and negative signal depending on the values of data S1$i$ and S1$q$ assigned to the head pulse slot and generates symbol pulses SPi and SPq of amplitude level $\beta$ only if symbol timing ST is "1," and generates symbol pulses SPi and SPq of amplitude level 0 and outputs symbol pulses SPi and SPq to adders 503-$i$ and 503-$q$, if symbol timing ST is "0," regardless of the values of data S1$i$ and S1$q$ Data pulse generating section 502-$i$ has delayer 5021-ki (k=2 to n), level converter 5022-ki (k=2 to n) and adder 5023-$i$. Delayer 5021-ki delays symbol timing ST by (pulse slot width Tp×(k−1)). Further, level converter 5022-ki converts delayed symbol timing ST into a positive and negative signal depending on the value of data Ski. Adder 5023-$i$ adds each positive and negative signal outputted from level converters 5022-ki and generates data pulse Dpi.

Similarly, data pulse generating section 502-$q$ has delayer 5021-kq (k=2 to n), level converter 5022-kq (k=2 to n) and adder 5023-$q$. Delayer 5021-kq delays symbol timing ST by (pulse slot width Tp×(k−1)). Further, level converter 5022-kq converts delayed symbol timing ST into a positive and negative signal depending on the value of data Skq. Adder 5023-$q$ adds each positive and negative signal outputted from level converter 5022-kq and generates data pulse DPq.

In this way, data pulse generating sections 502-$i$ and 502-$q$ assign data Ski and Skq (k=2 to n) to pulse slots 2 to n, and, if delayed symbol timings ST are "1," convert symbol timings ST into positive and negative signals depending on the values of data Ski and Skq (k=2 to n), and generates data pulses Dpi and DPq of amplitude level $\alpha$. Further, if delayed symbol timings ST are "0," data pulse generating sections 502-$i$ and 502-$q$ generate data pulses Dpi and Dpq of amplitude level 0 and output data pulses Dpi and Dpq to adders 503-$i$ and 503-$q$, regardless of the values of data Ski and Skq.

Adders 503-$i$ adds symbol pulse SPi and data pulse DPi and outputs the result to quadrature modulating section as an I-pulse modulated signal. Similarly, adder 503-$q$ adds symbol pulse SPq and data pulse DPq and outputs the result to quadrature modulating section 504 as a Q-pulse modulated signal.

Quadrature modulating section 504 has oscillator 5040, phase shifter 5041, mixers 5042-$i$ and 5042-$q$ and adder 5043. Oscillator 5040 generates and outputs a carrier signal to mixer 5042-$i$ and phase shifter 5041. Phase shifter 5041 converts the carrier signal of the reference phase generated in oscillator 5040 into a carrier signal shifted by 90 degrees ($\pi/2$) from the carrier signal of the reference phase, and outputs the result to mixer 5042-$q$. Mixer 5042-$i$ multiplies the I-pulse modulated signal outputted from adder 503-$i$ by the carrier signal of the reference phase. Similarly, mixer 5042-$q$ multiplies the Q-pulse modulated signal outputted from adder 503-$q$ by the carrier signal shifted by 90 degrees from the reference phase.

Adder 5043 adds the I-pulse modulated signal and the Q-pulse modulated signal each multiplied by the carrier signal and generates a radio frequency pulse modulated signal (hereinafter "quadrature modulated signal").

Figure 14:
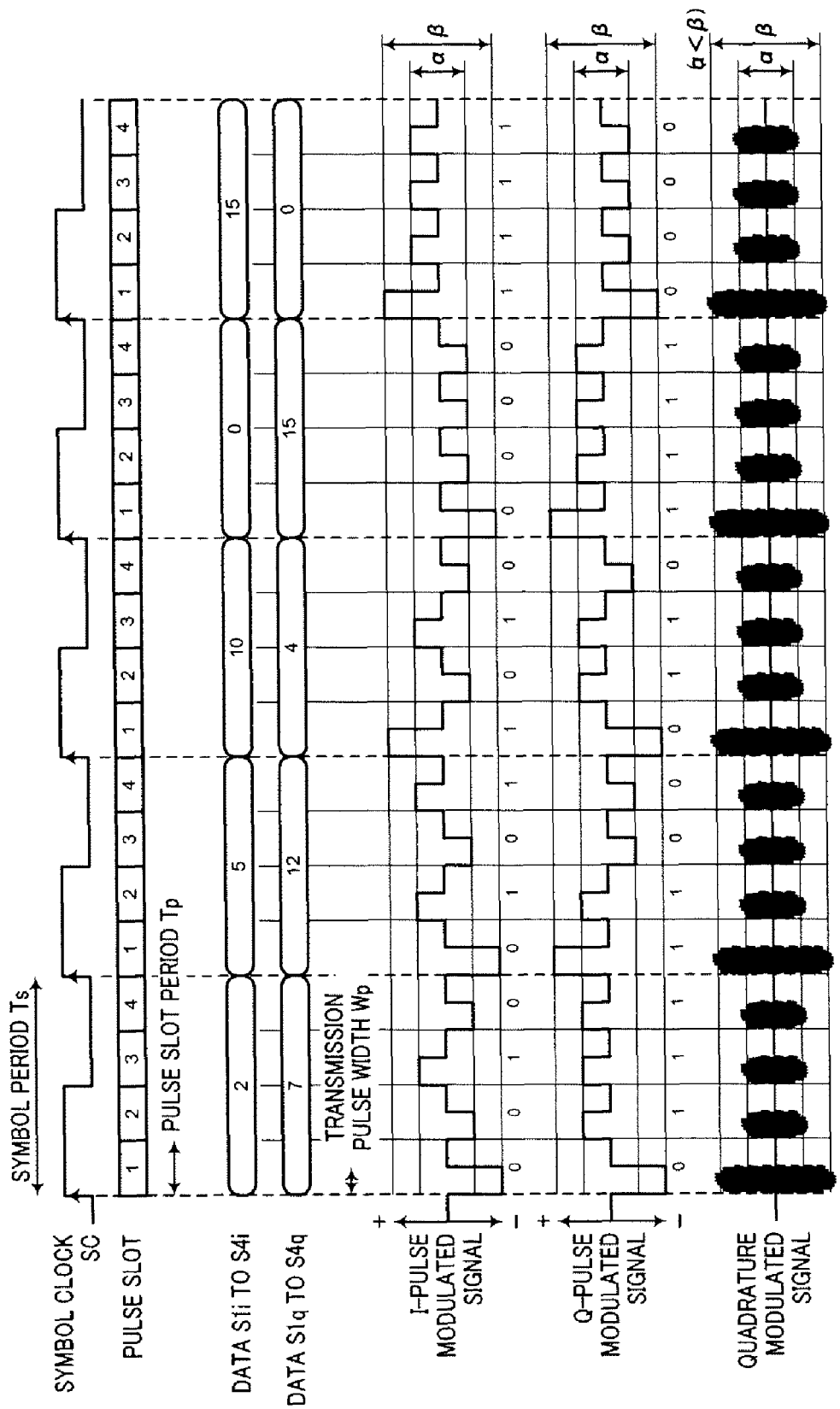
FIG. 14 is a time chart illustrating the operation of the pulse transmitting apparatus according to Embodiment 6.

Next, the operation of pulse transmitting apparatus 500 configured as described above will be described using the timing chart of FIG. 14. FIG. 14 shows a case where four-bit data information is assigned as one symbol, to each of the I-axis and the Q-axis. In this case, data information is assigned to a pulse slot having pulse slot period TP of a one-fourth of one symbol period Ts. Further, the following description will assume a case where n-bit data information is assigned to one symbol period Ts.

First, data distributor 101 distributes data information to data S1$i$ to Sn$i$ and data S1$q$ to Sn$q$. Data S1$i$ is outputted to level converter 5011-$i$ of symbol pulse generating section 501-$i$. Further, data S2$i$ to Sn$i$ are outputted to level converters 5022-2$i$ to 5022-ni of data pulse generating section 502-$i$. Similarly, data S1$q$ is outputted to level converter 5011-$q$ of symbol pulse generating section 501-$q$. First, data S2$q$ to Sn$q$ are outputted to level converters 5022-2$q$ to 5022-nq of data pulse generating section 502-$q$.

On the other hand, as described above, when triggered by a rise of symbol clock SC, symbol timing ST is generated to become "H" only during the period of the pulse width of the desired pulse signal and is outputted to symbol pulse generating sections 501-$i$ and 501-$q$ and data pulse generating sections 502-$i$ and 502-$q$.

Then, symbol timing ST is converted into a positive and negative signal depending on the value of data S1$i$ in level converter 5011-$i$ and amplifier 5012-$i$ of symbol pulse generating section 501-$i$. Symbol timing ST is amplified to amplitude level $\beta$ and is outputted to adder 503-$i$ as symbol pulse SPi. In this way, the amplitude level of symbol pulse SPi becomes 0 or $\beta$ depending on symbol timing ST and data S1$i$.

Further, symbol timing ST is delayed by (pulse slot width Tp×(k−1)) by delayer 5021-ki (k=2 to n) of data pulse generating section 502-$i$ and outputted to level converter 5022-ki (k=2 ton). Then, delayed symbol timing ST is converted into a positive and negative signal depending on the value of data Ski (k=2 to n) in level converter 5022-ki (k=2 to n). In this way, the amplitude level of data pulse DPi becomes 0 or $\alpha$ depending on symbol timing ST and data Ski.

In this way, the amplitude level of symbol pulse SPi in the head pulse slot interval is set greater than the amplitude level of data pulse DPi in the subsequent pulse slot intervals.

Then, symbol timing ST is added data Ski (k=2 to n) by adder 5023-$i$, and data pulse DPi in which data S2$i$ to Sn$i$ are assigned to the subsequent pulse slots is generated.

Then, adder 503-$i$ combines symbol pulse SPi and data pulse DPi, that is, the head pulse slot and the subsequent pulse slots, and generates an I-pulse modulated signal forming one symbol.

Similar to symbol pulse generating section 501-$i$ and data pulse generating section 502-$i$, symbol pulse SPq and data pulse DPq are generated in symbol pulse generating section 501-$q$ and data pulse generating section 502-$q$. Further, adder 503-$q$ combines symbol pulse SPq and data pulse DPq, that is, the head pulse slot and the subsequent pulse slots, and generates a Q-pulse modulated signal forming one symbol.

Then, the I-pulse modulated signal is multiplied by the carrier signal of the reference phase outputted from oscillator 5040 in mixer 5042-*i*, and, similarly, the Q-pulse modulated signal is multiplied by the carrier signal shifted by 90 degrees from the reference phase outputted from phase shifter 5041 in mixer 5042-*q*. Further, adder 5043 adds the I-pulse modulated signal and the Q-pulse modulated signal each multiplied by the carrier signal and generates a radio frequency quadrature modulated signal.

As described above, data Ski and Skq (k=1 to n) are all assigned to pulse slots k using symbol timing ST as the reference. Consequently, it is possible to acquire synchronization with the quadrature modulated signal at the receiving end if only symbol timing ST is detected. That is, by setting the amplitude level of the quadrature modulated signal in the head pulse slot interval in which symbol timing ST is superimposed, greater than the amplitude levels of the quadrature modulated signal in subsequent pulse slot intervals, symbol timing ST can be detected more easily at the receiving end, so that it is possible to demodulate a quadrature modulated signal more accurately.

As described above, with the present embodiment, symbol pulse generating sections 501-*i* and 501-*q*, data pulse generating sections 502-*i* and 502-*q* and adders 503-*i* and 503-*q* are provided for the I-axis and the Q-axis.

With the present embodiment, symbol pulse generating sections 501-*i* and 501-*q* generate symbol pulses SPi and SPq by using binaries which are greater than the amplitude levels of data pulses DPi and DPq and which have inverse polarities and selecting the I-component and the Q-component according to data S1*i* and S1*q* of each axis distributed in the head pulse slot. Further, data pulse generating sections 502-*i* and 502-*q* generate data pulses DPi and DPq for the I-axis and the Q-axis by using binaries which have inverse polarities and selecting the I-component and the Q-component according to data Ski and Skq (k=2 to n) of each axis distributed to the subsequent pulse slots. Further, adders 503*i* and 503*q* add symbol pulse SPi and data pulse DPi and add symbol pulse SPq and data pulse DPq for each axis, and generate an I/Q-pulse modulated signals. Further, quadrature modulating section 504 generates a quadrature modulated signal using a carrier signal.

As described above, according to the present embodiment, it is possible to support pulse communication in the radio frequency band using the quadrature phase shift keying scheme (or QPSK modulation scheme).

Further, although FIG. 14 shows an example of a case where the amplitude level of the quadrature modulated signal is the same as the amplitude levels of the I/Q-pulse modulated signals, the present invention is not limited to the case where the amplitude level of the quadrature modulated signal is the same as the amplitude levels of the I/Q pulse modulated signals, the amplitude level of the quadrature modulated signal may be increased or decreased, as long as the relationship of $\alpha < \beta$, that is, the relationship showing that the amplitude level of the quadrature modulated signal in the head pulse slot interval is greater than the amplitude levels of the quadrature modulated signal in the subsequent pulse slot intervals is maintained.

Further, the quadrature modulated signal may be generated by making the pulse width of a quadrature modulated signal the same as pulse slot period Tp to be the same as the ASK modulated signal.

Further, although a case has been described where the amplitude levels of data pulses DPi and DPq are the same as the amplitude level of symbol timing ST, these amplitude levels need not to be the same, as long as the amplitude levels of symbol pulses SPi and SPq are greater than the amplitude levels of data pulses DPi and DPq.

Furthermore, although level converters 5011-*i*, 5011-*q*, 5022-ki (k=2 to n) and 5022-kq (k=2 to n) convert symbol timing ST into the positive (+) polarity if the values of data Ski and Skq (k=1 to n) are "1," and convert symbol timing ST into the negative (−) polarity if the values of data Ski and Skq (k=1 to n) are "0," the conversion logic may be opposite to the above-described logic, as long as the rule of conversion is maintained between the transmitting end and the receiving end.

(Embodiment 7)

Figure 15:
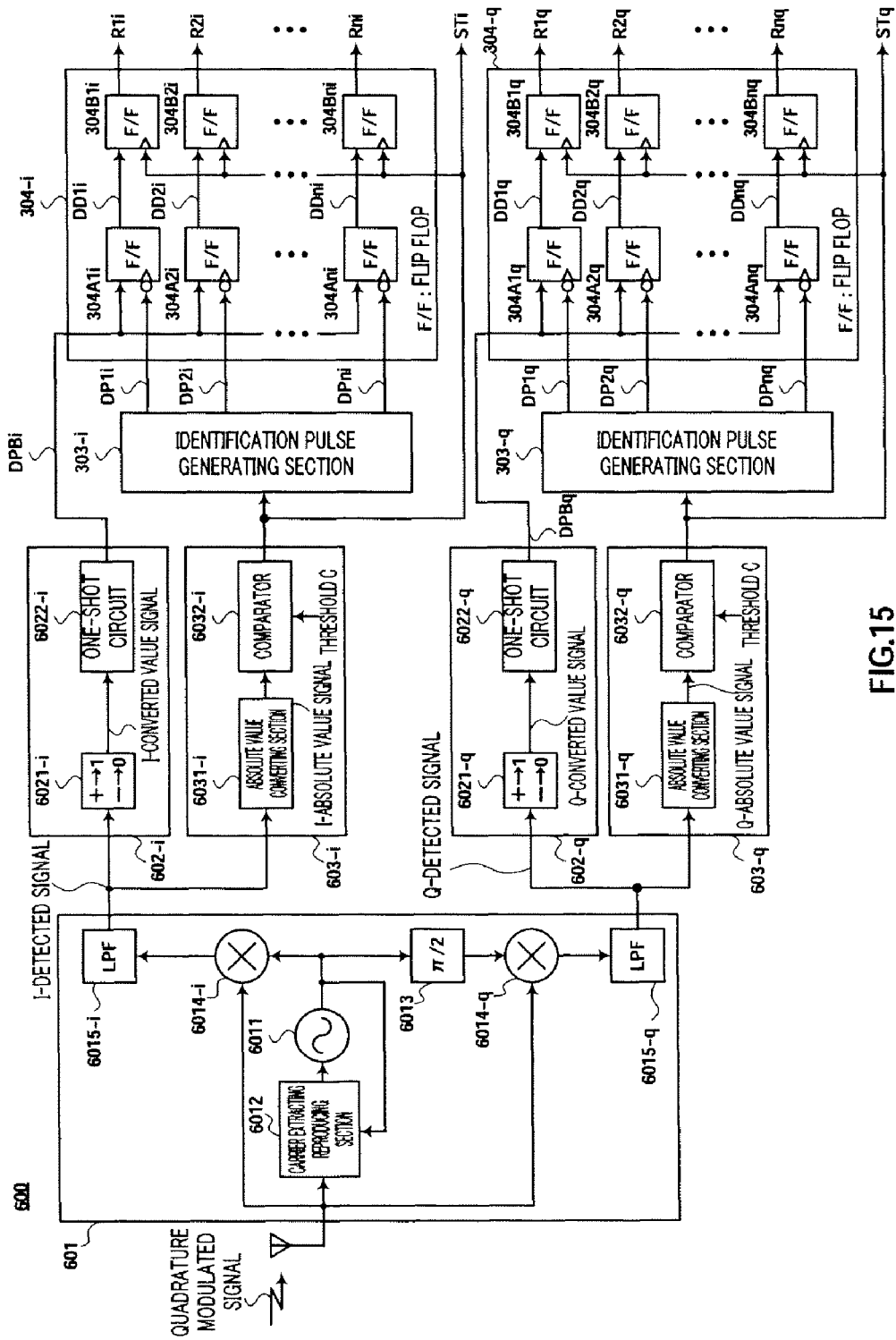
FIG. 15 is a block diagram showing a main configuration of the pulse receiving apparatus according to Embodiment 7 of the present invention.

FIG. 15 shows a main configuration of the pulse receiving apparatus according to Embodiment 7 of the present invention. Pulse receiving apparatus 600 shown in FIG. 15 receives and demodulates a quadrature modulated signal transmitted from pulse transmitting apparatus 500 according to Embodiment 6.

Pulse receiving apparatus 600 has quadrature detecting section 601, data pulse detecting sections 602-*i* and 602-*q*, symbol timing detecting sections 603-*i* and 603-*q*, identification pulse generating sections 303-*i* and 303-*q* and data generating sections 304-*i* and 304-*q*.

Quadrature detecting section 601 is composed of voltage controlling oscillator 6011, carrier extracting reproducing section 6012, phase shifter 6013, mixers 6014-*i* and 6014-*q*, and low pass filters 6015-*i* and 6015-*q*. Voltage controlling oscillator 6011 generates a carrier signal of the same frequency as oscillator 5040 applied upon quadrature modulation in pulse transmitting apparatus 500. Carrier extracting reproducing section 6012 extracts the absolute phase of the carrier signal from the quadrature modulated signal transmitted, controls the voltage of voltage controlling oscillator 6011 based on the extracted absolute phase and reproduces a stable carrier signal. Phase shifter 6013 converts the reproduced carrier signal into a carrier signal shifted by 90 degrees ($\pi/2$) from the reference phase.

Mixers 6014-*i* and 6014-*q* multiply the inputted quadrature modulated signals by the reproduced carrier signal of the reference phase and the carrier signal shifted by 90 degrees from the reference phase and extract baseband phase information. Low pass filters 6015-*i* and 6015-*q* remove the frequency components twice an unnecessary carrier from the extracted phase information and generate the I-detected signal and the Q-detected signal. Low pass filter 6015-*i* outputs the I-detected signal to data pulse detecting section 602-*i* and symbol timing detecting section 603-*i*. Further, low pass filter 6015-*q* outputs the Q-detected signal to data pulse detecting section 602-*q* and symbol timing detecting section 603-*q*.

Data pulse detecting section 602-*i* is composed of level converter 6021-*i* and one-shot circuit 6022-*i*. Level converter 6021-*i* binarizes the positive and negative level of the I-detected signal to a digital signal represented by "1" or "0." As described in Embodiment 6, the transmitting end associates data S1*i* assigned to the head pulse slot, data Ski (k=2 to n) assigned to the subsequent pulse slots and the polarity of the I-pulse modulated signal. Consequently, by performing threshold decision of the I-detected signal and threshold zero, level converter 6021-*i* extracts data Ski (k=1 to n) assigned to the head pulse slot and the subsequent pulse slots. When triggered by a rise of a digital signal, one-shot circuit 6022-*i* generates data pulse DPBi that becomes an "H" pulse only during the period of pulse slot period Tp and outputs data pulse DPBi to data generating section 304-*i*.

Similarly, data pulse detecting section 602-*q* is composed of level converter 6021-*q* and one-shot circuit 6022-*q*. Level converter 6021-*q* binarizes the positive and negative level of the Q-detected signal to a digital signal represented by "1" or "0". Similar to level converter 6021-$i$, by performing threshold decision of the Q-detected signal and threshold zero, level converter 6021-$q$ extracts data Skq (k=1 to n) assigned to the head pulse slot and the subsequent pulse slots. When triggered by a rise of the digital signal, one-shot circuit 6022-$q$ generates data pulse DPBq that becomes an 'H' pulse only during the period of pulse slot period Tp and outputs data pulse DPBq to data generating section 304-$q$.

Symbol timing detecting section 603-$i$ is composed of absolute value converting section 6031-$i$ and comparator 6032-$i$, and symbol timing detecting section 603-$q$ is composed of absolute value converting section 6031-$q$ and comparator 6032-$q$. Absolute value converting sections 6031-$i$ and 6031-$q$ change the levels of the I-detected signal and the Q-detected signal to absolute values. Comparators 6032-$i$ and 6032-$q$ compare the amplitude levels of the I-absolute value signal and the Q-absolute value signal which are changed to absolute values, with threshold C and convert the amplitude levels into binary digital signals.

Threshold C in comparators 6032-$i$ and 6032-$q$ is a value satisfying the relationship of $\alpha/2<C<\beta/2$ so that amplitude levels $\alpha$ and $\beta$ set at the transmitting end can be identified. By this means, when the amplitude level of the absolute value signal is greater than threshold C, it is possible to decide that the slot position is the head pulse slot. As described above, symbol timing ST is assigned only to the head pulse slot and transmitted from pulse transmitting apparatus 500. In this way, when the position of the head pulse slot can be learned by threshold decision, it is possible to detect symbol timings STi and STq. Symbol timing detecting sections 603-$i$ and 603-$q$ output detected symbol timing STi and STq to identification pulse generating section 303-$i$ and data generating 304-$i$, and identification pulse generating section 303-$q$ and data generating 304-$q$, respectively.

Identification pulse generating sections 303-$i$ and 303-$q$ and data generating sections 304-$i$ and 304-$q$ employ the same configuration as identification pulse generating section 303 and data generating section 304 described in Embodiment 4, and so repetition of description will be omitted. Further, data pulse DPki (k=1 to n) is supplied from identification pulse generating section 303-$i$ to data generating section 304-$i$ of FIG. 15, and data pulse DPkq (k=1 to n) is supplied from identification pulse generating section 303-$q$ to data generating section 304-$q$.

Figure 16:
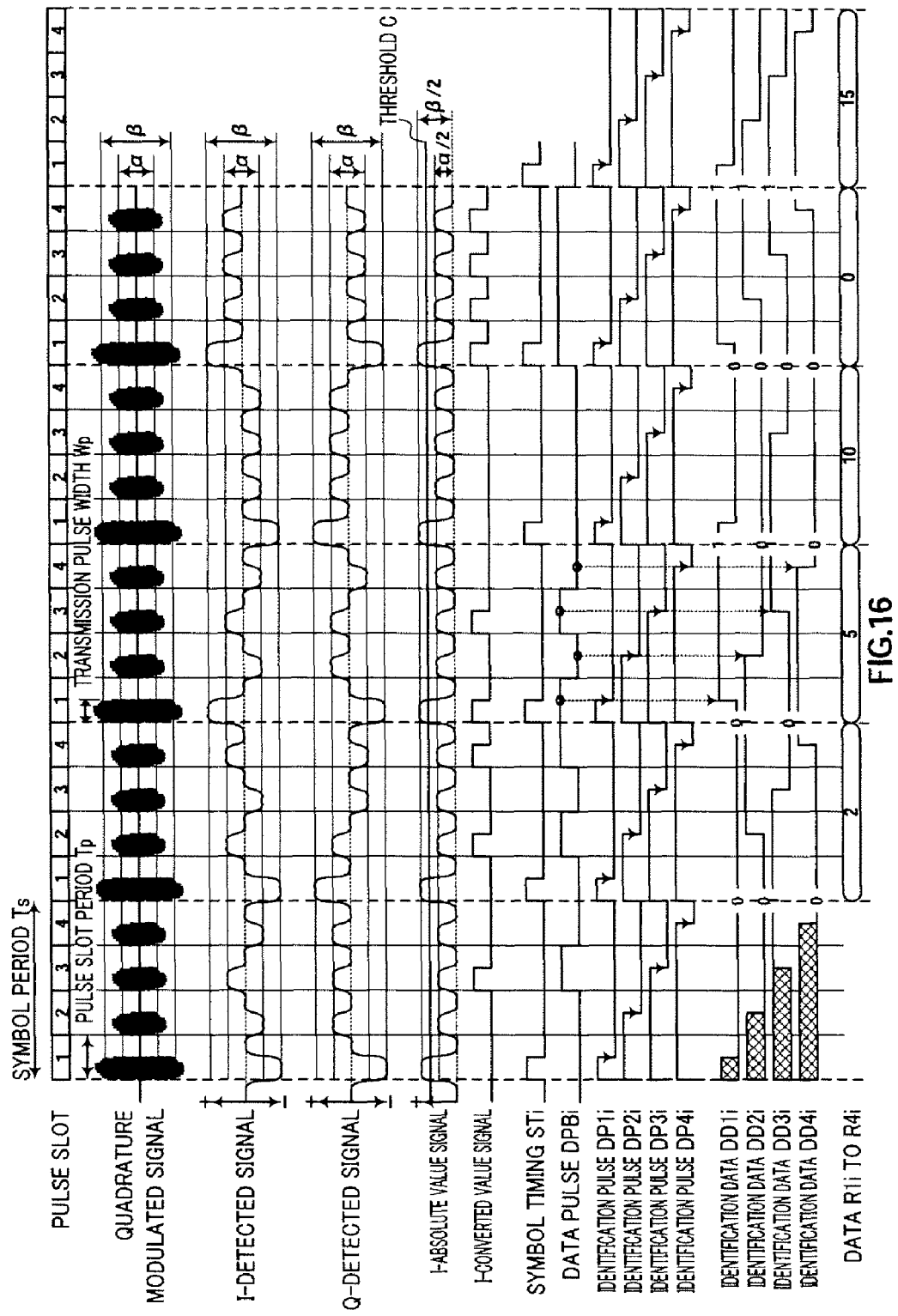
FIG. 16 is a time chart illustrating the operation of the pulse receiving apparatus according to Embodiment 7.

Next, the operation of pulse receiving apparatus 600 configured as described above will be described using the timing chart of FIG. 16. FIG. 16 shows an example of a case where four-bit data information is assigned to one symbol each in the I-axis and the Q-axis in transmitting apparatus 500, and is an example of a timing chart of a quadrature modulated signal assigned per pulse slot obtained by dividing one symbol period Ts into four pulse slots. Further, in FIG. 16, although the signals shown below the Q-detected signal are only signals processed in the I-axis system, the same applies to the Q-axis. The following description will assume a case where one symbol period Ts is divided into n pulse slots and data information is assigned to the pulse slots.

Quadrature detecting section 601 performs quadrature detection of the quadrature modulated signal transmitted from pulse transmitting apparatus 500 (not shown), and outputs the I-detected signal and the Q-detected signal after quadrature detection to data pulse detecting section 602-$i$ and symbol timing detecting section 603-$i$, and data pulse detecting section 602-$q$ and symbol timing detecting section 603-$q$, respectively. Then, level converters 6021-$i$ and 6021-$q$ of data pulse detecting sections 602-$i$ and 602-$q$ binarize the positive and negative levels of the I-detected signal and the Q-detected signal to digital signals represented by "1" and "0." To be more specific, if the level is positive (+), the positive and negative level is binarized to "1," and, if the level is negative (−), the positive and negative level is binarized to "0."

The I-converted value signal and the Q-converted value signal after conversion are outputted to one-shot circuits 6022-$i$ and 6022-$q$, respectively. Further, when triggered by a rise of the detected pulse, one-shot circuits 6022-$i$ and 6022-$q$ generate an "H" pulse only during the period of pulse slot period Tp. Furthermore, generated data pulses DPBi and DPBq are inputted to flip flops 304Aki and 304Akq (k=1 to n) of data generating sections 304-$i$ and 304-$q$.

Further, for the I-detected signal and the Q-detected signal, in absolute value converting sections 6031-$i$ and 6031-$q$ of symbol timing detecting sections 603-$i$ and 603-$q$, the negative (−) level is changed to the absolute value of the positive (+) level and the positive (+) level is changed to the absolute value of the positive (+) level. Then, comparators 6032-$i$ and 6032-$q$ perform threshold decision to decide whether or not the amplitude levels of the I-absolute value signal and the Q-absolute value signal, which are changed to the absolute values, are greater than threshold C, and the I-absolute value signal and the Q-absolute value signal, which are changed to the absolute values, are converted into binary digital signals. Given that threshold C is set to satisfy $\alpha/2<C<\beta/2$ as described above, the region that is decided greater than threshold C by threshold decision means the head slot to which the symbol timing is assigned.

In this way, symbol timing detecting sections 603-$i$ and 603-$q$ detect symbol timings STi and STq. Further, detected symbol timings STi and STq are outputted to identification pulse generating sections 303-$i$ and 303-$q$, and are outputted to flip flops 304Bki and 304Bkq (k=1 to n) of data generating sections 304-$i$ and 304-$q$. Then, identification pulse generating sections 303-$i$ and 303-$q$ generate identification pulses DPki and DPkq (k=1 to n) using symbol timings STi and STq, and output identification pulses DPki and DPkq to flip flops 304Aki and 304Akq (k=1 to n) of data generating sections 304-$i$ and 304-$q$.

Further, flip flops 304Aki and 304Akq (k=1 to n) of data generating sections 304-$i$ and 304-$q$ sample data pulses DPBi and DPBq at the trailing edges of identification pulses DPki and DPkq (k=1 to n). Next, flip flops 304Bki and 304Bkq (k=1 to n) acquire phase synchronization of sampled identification data DDki and DDkq (k=1 to n) at the rising edge of the symbol timing and demodulate sampled identification data DDki and DDkq as data Rki and Rkq (k=1 to n).

As described above, according to the present embodiment, by performing threshold decision of the I-detected signal and the Q-detected signal after quadrature detection using threshold C ($\alpha/2<C<\beta/2$), extracting symbol timings STi and STq from the threshold decision results and further performing threshold decision of the I-detected signal and the Q-detected signal with threshold zero, it is possible to extract data pulses DPBi and DPBq distributed to the head pulse slot and the subsequent pulse slots. Consequently, data Rki and Rkq (k=1 to n) can be demodulated by sampling data pulses DPBi and DPBq using resulting symbol timings STi and STq, so that it is possible to support pulse communication in the radio frequency band using the quadrature phase shift keying scheme (or QPSK modulation scheme).

Further, although a case has been described with an example of conversion where level converters 6021-$i$ and 6021-$q$ shown in FIG. 15 become "1" when the I-detected signal and the Q-detected signal are positive (+) and become "0" when the I-detected signal and the Q-detected signal are negative (−), the logic of conversion may be opposite to the above-described logic, as long as the rule of conversion is maintained between the transmitting end and the receiving end.

Further, although FIG. 16 shows a case where threshold C satisfies $\alpha/2 < C < \beta/2$, optimal threshold C may be set according to the amplitude level after quadrature detection.

An aspect of the pulse transmitting apparatus according to the present invention employs a configuration including: a distributing means that distributes n bits of data information, bit by bit, to pulse slots having a slot width of a one-n-th of a symbol period; a data pulse generating means that selects an amplitude level matching the data information distributed to subsequent pulse slots other than a head pulse slot, and generates a data pulse modulated signal in intervals of the subsequent pulse slots; a symbol pulse generating means that selects, from binary amplitude levels greater than the amplitude level of the data pulse modulated signal, one of the amplitude levels according to the data information distributed to the head pulse slot, and generates a symbol pulse modulated signal in the head pulse slot interval; and an adding means that adds the symbol pulse modulated signal and the data pulse modulated signal and generates a pulse modulated signal.

According to this configuration, transmission is performed by changing the amplitude levels of the pulse modulated signal generated in pulse slot intervals on a per pulse slot basis according to the data information assigned to pulse slots and the pulse slot position in symbols, and data information is prevented from being assigned in the pulse width, so that, even when the transmission rate becomes high-speed, a high-speed clock signal for controlling the pulse width is not necessary and the pulse modulated signal can be generated with a comparatively simple configuration. Further, regardless of data information, the amplitude level of the pulse modulated signal in the head pulse slot interval is greater at all times than the amplitude levels of the pulse modulated signal in the subsequent pulse slot intervals, so that it is easy to detect the head pulse slot position and it is possible to acquire synchronization with the pulse modulated signal in a reliable manner. Furthermore, the symbol timing and data information can be superimposed in the head pulse slot, so that it is possible to prevent deterioration of transmission efficiency.

An aspect of the pulse transmitting apparatus according to the present invention employs a configuration in which the symbol pulse generating means has: first and second amplifying means that amplify a symbol timing pulse showing a position of the head pulse slot, by respective amplification factors; and a selecting means that selects one of outputs of the first and second amplifying means according to the data information distributed to the head pulse slot.

According to this configuration, the amplitude level of the pulse modulated signal in the head pulse slot interval can be switched easily with a simple configuration.

An aspect of the pulse transmitting apparatus according to the present invention further has a symbol timing generating means that generates a symbol timing pulse of a pulse width equal to or less than the slot width in the interval of the head pulse slot, and employs a configuration in which the data pulse generating means has: a delayer that receives as input the symbol timing pulse and forms a plurality of delayed symbol timing pulses in which the amount of delay increases on a per slot time basis; a logical AND circuit that performs a logical AND operation of the delayed symbol timing pulse and the data information distributed to the subsequent pulse slots, per subsequent pulse slot; and a logical OR circuit that performs a logical OR operation of logical AND operation results of the subsequent pulse slots, and generates the data pulse modulated signal.

According to this configuration, the pulse widths of the pulse modulated signal in the subsequent pulse slot intervals and the position of the pulse modulated signal in pulse slot intervals can be controlled using a delay signal of the symbol timing pulse, so that, even when the transmission rate becomes high-speed, it is possible to generate the pulse modulated signal with a comparatively simple configuration.

An aspect of the pulse transmitting apparatus according to the present invention employs a configuration in which the symbol timing generating means has a one-shot circuit.

According to this configuration, the symbol timing pulse is generated by the one-shot circuit, and, consequently, the pulse modulated signal can be generated with a comparatively simple configuration. Further, the one-shot circuit is also able to easily generate the symbol timing pulse employing as the pulse width the slot width of the pulse slot, and, consequently, it is also possible to support the ASK modulated signal.

An aspect of the pulse transmitting apparatus according to the present invention further has a carrier modulated signal generating means that multiplies the pulse modulated signal by a carrier and generates a carrier modulated signal.

According to this configuration, it is possible to generate a radio frequency pulse modulated signal with a comparatively simple configuration and support wireless communication.

An aspect of the pulse transmitting apparatus according to the present invention has: the data pulse generating means, the symbol pulse generating means and adding means for an in-phase axis and a quadrature axis; and a quadrature modulating means that generates a quadrature modulated signal, and employs a configuration in which: the distributing means distributes n bits of data information to the in-phase axis and the quadrature axis; the data pulse generating means selects an in-phase component and a quadrature component from a binary which has inverse polarities, according to the data information of each axis distributed to the subsequent pulse slots, and generates the data pulse modulated signals for the in-phase axis and the quadrature axis; the symbol pulse generating means selects, from the binary which is greater than the amplitude level of the data pulse modulated signal and which has the inverse polarities, the in-phase component and the quadrature component, according to the data information of each axis distributed to the head pulse slot, and generates the symbol pulse modulated signals for the in-phase axis and the quadrature axis; the adding means adds the symbol pulse modulated signal and the data pulse modulated signal for the in-phase axis, and the symbol pulse modulated signal and the data pulse modulated signal for the quadrature axis, and generates an in-phase pulse modulated signal and a quadrature pulse modulated signal; and the quadrature modulating means performs quadrature modulation of the in-phase pulse modulated signal and the quadrature pulse modulated signal and generates the quadrature modulated signal.

According to this configuration, transmission is performed by changing the amplitude levels of the I-pulse modulated signal and the Q-pulse modulated signal generated in pulse slot intervals on a per pulse slot basis according to the data information assigned in pulse slots and the pulse slot positions in symbols and data information is prevented from being assigned in the pulse width, so that, even when the transmission rate becomes high-speed, a high-speed clock signal for controlling the pulse width is not necessary and the pulse modulated signal can be generated with a comparatively simple configuration. Further, regardless of data information, the amplitude level of the pulse modulated signal in the head pulse slot interval is greater at all times than the amplitude levels of the pulse modulated signal in the subsequent pulse slot intervals, so that it is easy to detect the head pulse slot position and it is possible to acquire synchronization with the pulse modulated signal in a reliable manner. Furthermore, the symbol timing and data information can be superimposed in the head pulse slot, so that it is possible to prevent deterioration of transmission efficiency.

An aspect of the pulse transmitting apparatus according to the present invention employs a configuration in which the symbol pulse generating means has: a level converter that switches a polarity of a symbol timing pulse showing a position of the head pulse slot according to the data information distributed to the head pulse slot; and an amplifying means that amplifies an output of the level converter.

According to this configuration, the amplitude levels of I/Q-pulse modulated signals in the head pulse slot interval can be switched easily with a simple configuration.

An aspect of the pulse transmitting apparatus according to the present invention further has a symbol timing generating means that generates, in the interval of the head pulse slot, a symbol timing pulse of a pulse width equal to or less than the slot width, and employs a configuration in which the data pulse generating means has: a delayer that receives as input the symbol timing pulse and forms a plurality of delayed symbol timing pulses in which the amount of delay increases on a per slot time basis; a level converting means that switches a polarity of the delayed symbol timing pulses per subsequent pulse slot according to the data information distributed to the subsequent pulse slots; and an adding means that adds level conversion results of the subsequent pulse slots and generates the data pulse modulated signal.

According to this configuration, the pulse widths of the I/Q pulse modulated signals in the subsequent pulse slot intervals and the positions of the pulse modulated signal in pulse slot intervals can be controlled using a delay signal of the symbol timing pulse, so that, even when the transmission rate becomes high-speed, it is possible to generate a quadrature modulated signal with a comparatively simple configuration.

An aspect of the pulse receiving apparatus according to the present invention employs a configuration including: a receiving means that receives a pulse modulated signal transmitted by distributing symbol data formed with n bits of data information per symbol, bit by bit, to pulse slots having a slot width of a one-n-th of a symbol period; a symbol timing detecting means that detects a position of a head pulse slot by performing threshold decision of an amplitude level of the pulse modulated signal and a first threshold; a head data extracting means that extracts the data information distributed to the head pulse slot by performing threshold decision of the amplitude level of the pulse modulated signal and a second threshold; and a subsequent data extracting means that extracts the data information distributed to the subsequent pulse slots by performing threshold decision of the amplitude level of the pulse modulated signal and a third threshold.

According to this configuration, the head pulse slot showing the symbol timing position and the data information distributed to the head and subsequent pulse slots can be extracted, and, consequently, a high-speed clock signal is not necessary, so that simplification, miniaturization and lower power consumption of the pulse receiving apparatus can be realized without increasing the circuit scale. Further, by performing threshold decision using different thresholds, it is possible to separate the symbol timing and data information superimposed in the head pulse slot and prevent deterioration of transmission efficiency.

As aspect of the pulse receiving apparatus according to the present invention employs a configuration in which the second threshold is greater than the first threshold; and the third threshold is smaller than the first threshold.

According to this configuration, in a case where, from binary amplitude levels greater than amplitude level of the data pulse modulated signal in the subsequent pulse slot intervals, one of the amplitude levels is selected as the amplitude level of the pulse modulated signal in the head pulse slot interval in which the symbol timing is superimposed, according to the data information distributed to the head pulse slot, the symbol timing and information data assigned to the head and subsequent pulse slots can be extracted by threshold decision.

An aspect of the pulse receiving apparatus according to the present invention further has a detecting means has that detects an envelope of the pulse modulated signal multiplied by a carrier.

According to this configuration, it is possible to demodulate a radio frequency pulse modulated signal with a comparatively simple configuration and support wireless communication.

An aspect of the pulse receiving apparatus according to the present invention employs a configuration in which: the pulse modulated signal is a quadrature modulated signal transmitted by distributing symbol data formed with n bits of data information per symbol, bit by bit, to pulse slots having a slot width of a one-n-th of a symbol period in an I-axis and a Q-axis; the pulse receiving apparatus further has a quadrature detecting means that multiplies the quadrature modulated signal by a reference phase and a carrier shifted by ninety degrees from the reference phase and generates detected signals for the in-phase axis and the quadrature axis; the symbol timing means changes the detected signals to absolute values and detects the position of the head pulse slot by performing threshold decision of an amplitude level, which is changed to an absolute value, and the first threshold; the second threshold and the third threshold are zero; and the head pulse extracting means and the subsequent pulse extracting means extract data information distributed to the head pulse slot and the subsequent pulse slots according to whether the detected signals are positive or negative.

According to this configuration, by performing threshold decision of the I-axis and the Q-axis, the head pulse slot showing the symbol timing position and data information distributed to the head and subsequent pulse slots can be extracted per axis, and, consequently, the high-speed clock signal is not necessary for a quadrature modulated signal, so that simplification, miniaturization and lower power consumption of the pulse receiving apparatus can be realized without increasing the circuit scale. Further, by performing threshold decision using different thresholds, it is possible to separate the symbol timing and data information superimposed in the head pulse slot and prevent deterioration of transmission efficiency.

The disclosure of Japanese Patent Application No. 2006-117259, filed on Apr. 20, 2006, and Japanese Patent Application No. 2007-107032, filed on Apr. 16, 2007, including the specifications, drawings and abstracts, is incorporated herein by reference in its entirety.

INDUSTRIAL APPLICABILITY

The pulse transmitting apparatus, pulse receiving apparatus, pulse transmitting method and pulse demodulating method according to the present invention are able to generate and demodulate a pulse modulated signal with a comparatively simple configuration even when the transmission rate becomes high-speed, and are useful as the pulse transmitting apparatus, pulse receiving apparatus, pulse transmitting method and pulse demodulating method used in, for example, wireless communication and optical communication.

The invention claimed is:

1. A pulse transmitting apparatus comprising:
   a distributing section that distributes n bits of data information, bit by bit, to pulse slots having a slot width of a one-n-th of a symbol period;
   a data pulse generating section that selects an amplitude level matching the data information distributed to subsequent pulse slots other than a head pulse slot, and generates a data pulse modulated signal in intervals of the subsequent pulse slots;
   a symbol pulse generating section that selects, from binary amplitude levels greater than the amplitude level of the data pulse modulated signal, one of the amplitude levels according to the data information distributed to the head pulse slot, and generates a symbol pulse modulated signal in the head pulse slot interval; and
   an adding section that adds the symbol pulse modulated signal and the data pulse modulated signal and generates a pulse modulated signal.

2. The pulse transmitting apparatus according to claim 1, wherein the symbol pulse generating section comprises:
   first and second amplifying sections that amplify a symbol timing pulse showing a position of the head pulse slot, by respective amplification factors; and
   a selecting section that selects one of outputs of the first and second amplifying sections according to the data information distributed to the head pulse slot.

3. The pulse transmitting apparatus according to claim 1, further comprising a symbol timing generating section that generates a symbol timing pulse of a pulse width equal to or less than the slot width in the interval of the head pulse slot, wherein the data pulse generating section comprises:
   a delayer that receives as input the symbol timing pulse and forms a plurality of delayed symbol timing pulses in which the amount of delay increases on a per slot time basis;
   a logical AND circuit that performs a logical AND operation of the delayed symbol timing pulse and the data information distributed to the subsequent pulse slots, per subsequent pulse slot; and
   a logical OR circuit that performs a logical OR operation of logical AND operation results of the subsequent pulse slots, and generates the data pulse modulated signal.

4. The pulse transmitting apparatus according to claim 3, wherein the symbol timing generating section comprises a one-shot circuit.

5. The pulse transmitting apparatus according to claim 1, further comprising a carrier modulated signal generating section that multiplies the pulse modulated signal by a carrier and generates a carrier modulated signal.

6. The pulse transmitting apparatus according to claim 1, comprising:
   the data pulse generating sections, the symbol pulse generating sections and adding sections for an in-phase axis and a quadrature axis; and
   a quadrature modulating section that generates a quadrature modulated signal, wherein;
   the distributing section distributes n bits of data information to the in-phase axis and the quadrature axis;
   the data pulse generating section selects an in-phase component and a quadrature component from a binary which has inverse polarities, according to the data information of each axis distributed to the subsequent pulse slots, and generates the data pulse modulated signals for the in-phase axis and the quadrature axis;
   the symbol pulse generating section selects, from the binary which is greater than the amplitude level of the data pulse modulated signal and which has the inverse polarities, the in-phase component and the quadrature component, according to the data information of each axis distributed to the head pulse slot, and generates the symbol pulse modulated signals for the in-phase axis and the quadrature axis;
   the adding section adds the symbol pulse modulated signal and the data pulse modulated signal for the in-phase axis, and the symbol pulse modulated signal and the data pulse modulated signal for the quadrature axis, and generates an in-phase pulse modulated signal and a quadrature pulse modulated signal; and
   the quadrature modulating section performs quadrature modulation of the in-phase pulse modulated signal and the quadrature pulse modulated signal and generates the quadrature modulated signal.

7. The pulse transmitting apparatus according to claim 6, wherein the symbol pulse generating section comprises:
   a level converter that switches a polarity of a symbol timing pulse showing a position of the head pulse slot according to the data information distributed to the head pulse slot; and
   an amplifying section that amplifies an output of the level converter.

8. The pulse transmitting apparatus according to claim 6, further comprising a symbol timing generating section that generates, in the interval of the head pulse slot, a symbol timing pulse of a pulse width equal to or less than the slot width,
   wherein the data pulse generating section comprises:
   a delayer that receives as input the symbol timing pulse and forms a plurality of delayed symbol timing pulses in which the amount of delay increases on a per slot time basis;
   a level converting section that switches a polarity of the delayed symbol timing pulses per subsequent pulse slot according to the data information distributed to the subsequent pulse slots; and
   an adding section that adds level conversion results of the subsequent pulse slots and generates the data pulse modulated signal.

9. A pulse receiving apparatus comprising:
   a receiving section that receives a pulse modulated signal transmitted by distributing symbol data formed with n bits of data information per symbol, bit by bit, to pulse slots having a slot width of a one-n-th of a symbol period;
   a symbol timing detecting section that detects a position of a head pulse slot by performing threshold decision of an amplitude level of the pulse modulated signal and a first threshold;
   a head data extracting section that extracts the data information distributed to the head pulse slot by performing threshold decision of the amplitude level of the pulse modulated signal and a second threshold; and
   a subsequent data extracting section that extracts the data information distributed to the subsequent pulse slots by performing threshold decision of the amplitude level of the pulse modulated signal and a third threshold.

10. The pulse receiving apparatus according to claim 9, wherein:
the second threshold is greater than the first threshold; and
the third threshold is smaller than the first threshold.

11. The pulse receiving apparatus according to claim 9, further comprising a detecting section that detects an envelope of the pulse modulated signal multiplied by a carrier.

12. The pulse receiving apparatus according to claim 10, wherein:
the pulse modulated signal comprises a quadrature modulated signal transmitted by distributing symbol data formed with n bits of data information per symbol, bit by bit, to pulse slots having a slot width of a one-n-th of a symbol period in an in-phase axis and a quadrature axis;
the pulse receiving apparatus further comprises a quadrature detecting section that multiplies the quadrature modulated signal by a reference phase and a carrier shifted by ninety degrees from the reference phase and generates detected signals for the in-phase axis and the quadrature axis;
the symbol timing section changes the detected signals to absolute values and detects the position of the head pulse slot by performing threshold decision of an amplitude level, which is changed to an absolute value, and the first threshold;
the second threshold and the third threshold are zero; and
the head pulse extracting section and the subsequent pulse extracting section extract data information distributed to the head pulse slot and the subsequent pulse slots according to whether the detected signals are positive or negative.

13. A pulse transmitting method comprising:
distributing n bits of data information, bit by bit, to pulse slots having a slot width of a one-n-th of a symbol period;
selecting an amplitude level matching the data information distributed to subsequent pulse slots other than a head pulse slot and generating a data pulse modulated signal in intervals of the subsequent pulse slots;
selecting, from binary amplitude levels greater than the amplitude level of the data pulse modulated signal, one of the amplitude levels according to the data information distributed to the head pulse slot and generating a symbol pulse modulated signal in an interval of the head pulse slot; and
adding the symbol pulse modulated signal and the data pulse modulated signal and generating a pulse modulated signal.

14. A pulse demodulating method comprising:
receiving a pulse modulated signal transmitted by distributing symbol data formed with n bits of data information per symbol, bit by bit, to pulse slots having a slot width of a one-n-th of a symbol period;
detecting a position of a head pulse slot by performing threshold decision of an amplitude level of the pulse modulated signal and a first threshold;
extracting the data information distributed to the head pulse slot by performing threshold decision of the amplitude level of the pulse modulated signal and a second threshold; and
extracting the data information distributed to the subsequent pulse slots by performing threshold decision of the amplitude level of the pulse modulated signal and a third threshold.

* * * * *